(12) United States Patent
Starke et al.

(10) Patent No.: US 12,322,015 B2
(45) Date of Patent: Jun. 3, 2025

(54) DYNAMIC LOCOMOTION ADAPTATION IN RUNTIME GENERATED ENVIRONMENTS

(71) Applicant: Electronic Arts Inc., Redwood City, CA (US)

(72) Inventors: Wolfram Sebastian Starke, Edinburgh (GB); Harold Henry Chaput, Castro Valley, CA (US)

(73) Assignee: Electronic Arts Inc., Redwood City, CA (US)

( * ) Notice: Subject to any disclaimer, the term of this patent is extended or adjusted under 35 U.S.C. 154(b) by 429 days.

(21) Appl. No.: 17/550,973

(22) Filed: Dec. 14, 2021

(65) Prior Publication Data

US 2023/0186543 A1 Jun. 15, 2023

(51) Int. Cl.
| | | |
|---|---|---|
| G06T 13/40 | (2011.01) | |
| A63F 13/56 | (2014.01) | |
| G06N 20/00 | (2019.01) | |
| G06T 7/20 | (2017.01) | |
| G06T 7/70 | (2017.01) | |

(52) U.S. Cl.
CPC ............. *G06T 13/40* (2013.01); *A63F 13/56* (2014.09); *G06T 7/20* (2013.01); *G06T 7/70* (2017.01)

(58) Field of Classification Search
CPC ......... G06T 13/00; G06T 13/20; G06T 13/40; G06T 2207/20084; G06T 2213/12; A63F 13/56; A63F 13/57; A63F 13/60; A63F 13/65; A63F 2300/6009; A63F 2300/6607; G06N 3/02; G06N 3/088; G06N 7/01; G06N 20/00
See application file for complete search history.

(56) References Cited

U.S. PATENT DOCUMENTS

| | | | |
|---|---|---|---|
| 5,274,801 A | 12/1993 | Gordon | |
| 5,548,798 A | 8/1996 | King | |
| 5,982,389 A | 11/1999 | Guenter et al. | |
| 5,999,195 A | 12/1999 | Santangeli | |

(Continued)

FOREIGN PATENT DOCUMENTS

| | | | |
|---|---|---|---|
| CN | 102509272 A | 6/2012 | |
| CN | 103546736 A | 1/2014 | |

(Continued)

OTHER PUBLICATIONS

Starke et al. , "Local motion phases for learning multi-contact character movements." ACM Transactions on Graphics (TOG). Jul. 8, 2020, 39(4):54-1 (Year: 2020).*

(Continued)

*Primary Examiner* — Lawrence S Galka
(74) *Attorney, Agent, or Firm* — Knobbe, Martens, Olson & Bear, LLP

(57) ABSTRACT

Use of pose prediction models enables runtime animation to be generated for an electronic game. The pose prediction model can predict a character pose of a character based on joint data for a pose of the character in a previous frame. Further, by using environment data, it is possible to modify the prediction of the character pose based on a particular environment in which the character is location. Advantageously, the use of machine learning enables prediction of character movement in environment in which it is difficult or impossible to obtain motion capture data.

19 Claims, 5 Drawing Sheets

(56) References Cited

U.S. PATENT DOCUMENTS

| | | |
|---|---|---|
| 6,064,808 A | 5/2000 | Kapur et al. |
| 6,088,040 A | 7/2000 | Oda et al. |
| 6,253,193 B1 | 6/2001 | Ginter et al. |
| 6,556,196 B1 | 4/2003 | Blanz et al. |
| 6,961,060 B1 | 11/2005 | Mochizuki et al. |
| 7,006,090 B2 | 2/2006 | Mittring |
| 7,403,202 B1 | 7/2008 | Nash |
| 7,415,152 B2 | 8/2008 | Jiang et al. |
| 7,944,449 B2 | 5/2011 | Petrovic et al. |
| 8,100,770 B2 | 1/2012 | Yamazaki et al. |
| 8,142,282 B2 | 3/2012 | Canessa et al. |
| 8,154,544 B1 | 4/2012 | Cameron et al. |
| 8,207,971 B1 | 6/2012 | Koperwas et al. |
| 8,267,764 B1 | 9/2012 | Aoki et al. |
| 8,281,281 B1 | 10/2012 | Smyrl et al. |
| 8,395,626 B2 | 3/2013 | Millman |
| 8,398,476 B1 | 3/2013 | Sidhu et al. |
| 8,406,528 B1 | 3/2013 | Hatwich |
| 8,540,560 B2 | 9/2013 | Crowley et al. |
| 8,599,206 B2 | 12/2013 | Hodgins et al. |
| 8,624,904 B1 | 1/2014 | Koperwas et al. |
| 8,648,863 B1 | 2/2014 | Anderson et al. |
| 8,860,732 B2 | 10/2014 | Popovic et al. |
| 8,914,251 B2 | 12/2014 | Ohta |
| 9,001,132 B1 | 4/2015 | Wooley |
| 9,117,134 B1 | 8/2015 | Geiss et al. |
| 9,256,973 B2 | 2/2016 | Koperwas et al. |
| 9,317,954 B2 | 4/2016 | Li et al. |
| 9,483,860 B2 | 11/2016 | Hwang et al. |
| 9,616,329 B2 | 4/2017 | Szufnara et al. |
| 9,652,879 B2 | 5/2017 | Aguado |
| 9,741,146 B1 | 8/2017 | Nishimura |
| 9,811,716 B2 | 11/2017 | Kim et al. |
| 9,826,898 B1 | 11/2017 | Jin et al. |
| 9,858,700 B2 | 1/2018 | Rose et al. |
| 9,861,898 B2 | 1/2018 | Miura et al. |
| 9,947,123 B1 | 4/2018 | Green |
| 9,984,658 B2 | 5/2018 | Bonnier et al. |
| 9,990,754 B1 | 6/2018 | Waterson et al. |
| 9,996,940 B1 | 6/2018 | Yamasaki |
| 10,022,628 B1 | 7/2018 | Matsumiya et al. |
| 10,096,133 B1 | 10/2018 | Andreev |
| 10,118,097 B2 | 11/2018 | Stevens |
| 10,198,845 B1 | 2/2019 | Bhat et al. |
| 10,314,477 B1 | 6/2019 | Goodsitt et al. |
| 10,388,053 B1 | 8/2019 | Carter, Jr. et al. |
| 10,403,018 B1 | 9/2019 | Worsham |
| 10,440,443 B2 | 10/2019 | Casey et al. |
| 10,535,174 B1 | 1/2020 | Rigiroli et al. |
| 10,726,611 B1 | 7/2020 | Court |
| 10,733,765 B2 | 8/2020 | Andreev |
| 10,755,466 B2 | 8/2020 | Chamdani et al. |
| 10,792,566 B1 | 10/2020 | Schmid |
| 10,825,220 B1 | 11/2020 | Chang et al. |
| 10,856,733 B2 | 12/2020 | Anderson et al. |
| 10,860,838 B1 | 12/2020 | Elahie et al. |
| 10,878,540 B1 | 12/2020 | Stevens |
| 10,902,618 B2 | 1/2021 | Payne et al. |
| 10,986,400 B2 | 4/2021 | Hua et al. |
| 11,017,560 B1 | 5/2021 | Gafni et al. |
| 11,403,513 B2 | 8/2022 | Hasenclever et al. |
| 11,562,523 B1 | 1/2023 | Starke et al. |
| 11,670,030 B2 | 6/2023 | Shi et al. |
| 11,830,121 B1 | 11/2023 | Starke et al. |
| 11,995,754 B2 | 5/2024 | Starke et al. |
| 12,138,543 B1 | 11/2024 | Starke et al. |
| 2002/0054054 A1 | 5/2002 | Sanbe |
| 2002/0089504 A1 | 7/2002 | Merrick et al. |
| 2002/0180739 A1 | 12/2002 | Reynolds et al. |
| 2003/0038818 A1 | 2/2003 | Tidwell |
| 2004/0027352 A1 | 2/2004 | Minakuchi |
| 2004/0227760 A1 | 11/2004 | Anderson et al. |
| 2004/0227761 A1 | 11/2004 | Anderson et al. |
| 2005/0237550 A1 | 10/2005 | Hu |
| 2006/0036514 A1 | 2/2006 | Steelberg et al. |
| 2006/0149516 A1 | 7/2006 | Bond et al. |
| 2006/0217945 A1 | 9/2006 | Leprevost |
| 2006/0262114 A1 | 11/2006 | Leprevost |
| 2007/0085851 A1 | 4/2007 | Muller et al. |
| 2007/0097125 A1 | 5/2007 | Xie et al. |
| 2008/0049015 A1 | 2/2008 | Elmieh et al. |
| 2008/0111831 A1 | 5/2008 | Son et al. |
| 2008/0152218 A1 | 6/2008 | Okada |
| 2008/0268961 A1 | 10/2008 | Brook |
| 2008/0273039 A1 | 11/2008 | Girard |
| 2008/0316202 A1 | 12/2008 | Zhou et al. |
| 2009/0066700 A1 | 3/2009 | Harding et al. |
| 2009/0195544 A1 | 8/2009 | Wrinch et al. |
| 2009/0315839 A1 | 12/2009 | Wilson et al. |
| 2010/0134501 A1 | 6/2010 | Lowe et al. |
| 2010/0251185 A1 | 9/2010 | Pattenden |
| 2010/0277497 A1 | 11/2010 | Dong et al. |
| 2011/0012903 A1 | 1/2011 | Girard |
| 2011/0074807 A1 | 3/2011 | Inada et al. |
| 2011/0086702 A1 | 4/2011 | Borst et al. |
| 2011/0119332 A1 | 5/2011 | Marshall et al. |
| 2011/0128292 A1 | 6/2011 | Ghyme et al. |
| 2011/0164831 A1 | 7/2011 | Van Reeth et al. |
| 2011/0187731 A1 | 8/2011 | Tsuchida |
| 2011/0269540 A1 | 11/2011 | Gillo et al. |
| 2011/0292055 A1 | 12/2011 | Hodgins et al. |
| 2012/0029699 A1 | 2/2012 | Jing |
| 2012/0083330 A1 | 4/2012 | Ocko |
| 2012/0115580 A1 | 5/2012 | Hornik et al. |
| 2012/0220376 A1 | 8/2012 | Takayama et al. |
| 2012/0244941 A1 | 9/2012 | Ostergren et al. |
| 2012/0275521 A1 | 11/2012 | Cui et al. |
| 2012/0303343 A1 | 11/2012 | Sugiyama et al. |
| 2012/0313931 A1 | 12/2012 | Matsuike et al. |
| 2013/0050464 A1 | 2/2013 | Kang |
| 2013/0063555 A1 | 3/2013 | Matsumoto et al. |
| 2013/0120439 A1 | 5/2013 | Harris et al. |
| 2013/0121618 A1 | 5/2013 | Yadav |
| 2013/0222433 A1 | 8/2013 | Chapman et al. |
| 2013/0235045 A1 | 9/2013 | Corazza et al. |
| 2013/0263027 A1 | 10/2013 | Petschnigg et al. |
| 2013/0311885 A1 | 11/2013 | Wang et al. |
| 2014/0002463 A1 | 1/2014 | Kautzman et al. |
| 2014/0198106 A1 | 7/2014 | Sumner et al. |
| 2014/0198107 A1 | 7/2014 | Thomaszewski et al. |
| 2014/0285513 A1 | 9/2014 | Aguado |
| 2014/0327694 A1 | 11/2014 | Cao et al. |
| 2015/0113370 A1 | 4/2015 | Flider |
| 2015/0126277 A1 | 5/2015 | Aoyagi |
| 2015/0187113 A1 | 7/2015 | Rubin et al. |
| 2015/0235351 A1 | 8/2015 | Mirbach et al. |
| 2015/0243326 A1 | 8/2015 | Pacurariu et al. |
| 2015/0381925 A1 | 12/2015 | Varanasi et al. |
| 2016/0026926 A1 | 1/2016 | Yeung et al. |
| 2016/0042548 A1 | 2/2016 | Du et al. |
| 2016/0071470 A1 | 3/2016 | Kim et al. |
| 2016/0217723 A1 | 7/2016 | Kim et al. |
| 2016/0243699 A1 | 8/2016 | Kim |
| 2016/0307369 A1 | 10/2016 | Freedman et al. |
| 2016/0314617 A1 | 10/2016 | Forster et al. |
| 2016/0354693 A1 | 12/2016 | Yan et al. |
| 2017/0132827 A1 | 5/2017 | Tena et al. |
| 2017/0221250 A1 | 8/2017 | Aguado |
| 2017/0301310 A1 | 10/2017 | Bonnier et al. |
| 2017/0301316 A1 | 10/2017 | Farell |
| 2018/0122125 A1 | 5/2018 | Brewster |
| 2018/0165864 A1 | 6/2018 | Jin et al. |
| 2018/0211102 A1 | 7/2018 | Alsmadi |
| 2018/0239526 A1 | 8/2018 | Varanasi et al. |
| 2018/0293736 A1 | 10/2018 | Rahimi et al. |
| 2019/0073826 A1 | 3/2019 | Bailey et al. |
| 2019/0147224 A1 | 5/2019 | Li et al. |
| 2019/0228316 A1 | 7/2019 | Felsen et al. |
| 2019/0295305 A1 | 9/2019 | Yang et al. |
| 2019/0303658 A1* | 10/2019 | Ando .................... G06V 40/25 |
| 2019/0340803 A1 | 11/2019 | Comer |
| 2019/0392587 A1 | 12/2019 | Nowozin et al. |
| 2020/0035010 A1 | 1/2020 | Kim |
| 2020/0058148 A1 | 2/2020 | Blaylock et al. |

(56) References Cited

U.S. PATENT DOCUMENTS

| | | | |
|---|---|---|---|
| 2020/0222757 A1 | 7/2020 | Yang et al. | |
| 2020/0294299 A1 | 9/2020 | Rigiroli et al. | |
| 2020/0353311 A1 | 11/2020 | Ganguly et al. | |
| 2020/0388065 A1 | 12/2020 | Miller, IV et al. | |
| 2020/0402284 A1 | 12/2020 | Saragih et al. | |
| 2021/0019916 A1 | 1/2021 | Andreev | |
| 2021/0166459 A1 | 6/2021 | Miller, IV | |
| 2021/0217184 A1 | 7/2021 | Payne et al. | |
| 2021/0220739 A1 | 7/2021 | Zinno et al. | |
| 2021/0292824 A1 | 9/2021 | Zhang et al. | |
| 2021/0312689 A1* | 10/2021 | Akhoundi | G06N 20/00 |
| 2021/0335004 A1 | 10/2021 | Zohar et al. | |
| 2021/0375021 A1 | 12/2021 | Starke et al. | |
| 2021/0383585 A1 | 12/2021 | Zhao et al. | |
| 2021/0406765 A1 | 12/2021 | Zhang et al. | |
| 2022/0035443 A1 | 2/2022 | Winold et al. | |
| 2022/0076472 A1* | 3/2022 | Bocquelet | G06N 20/00 |
| 2022/0101646 A1 | 3/2022 | McDonald et al. | |
| 2022/0148335 A1 | 5/2022 | Liu | |
| 2022/0215232 A1 | 7/2022 | Pardeshi et al. | |
| 2022/0230376 A1 | 7/2022 | Rozantsev et al. | |
| 2022/0254157 A1 | 8/2022 | Fu et al. | |
| 2022/0292751 A1 | 9/2022 | Kimura | |
| 2022/0319087 A1 | 10/2022 | Zhang | |
| 2022/0379167 A1 | 12/2022 | Lee | |
| 2023/0010480 A1 | 1/2023 | Li et al. | |
| 2023/0123820 A1 | 4/2023 | Wang | |
| 2023/0177755 A1 | 6/2023 | Starke et al. | |
| 2023/0186541 A1 | 6/2023 | Starke et al. | |
| 2023/0237724 A1 | 7/2023 | Starke et al. | |
| 2023/0267668 A1 | 8/2023 | Starke et al. | |
| 2023/0300667 A1 | 9/2023 | Baek | |
| 2023/0306667 A1 | 9/2023 | Hopkins | |
| 2023/0310998 A1 | 10/2023 | Starke et al. | |
| 2023/0326113 A1 | 10/2023 | Hellge | |
| 2023/0334744 A1 | 10/2023 | Liu | |
| 2023/0394735 A1 | 12/2023 | Shi et al. | |
| 2024/0257429 A1 | 8/2024 | Starke et al. | |
| 2024/0307779 A1 | 9/2024 | Wu | |

FOREIGN PATENT DOCUMENTS

| | | |
|---|---|---|
| CN | 105405380 A | 3/2016 |
| CN | 105825778 A | 8/2016 |
| CN | 110039546 A | 7/2019 |
| JP | 2018-520820 A | 8/2018 |
| JP | 2019-162400 A | 9/2019 |
| WO | WO 2019/184633 A1 | 10/2019 |
| WO | WO 2020/204948 A1 | 10/2020 |

OTHER PUBLICATIONS

Anagnostopoulos et al., "Intelligent modification for the daltonization process", International Conference on Computer Vision Published in 2007 by Applied Computer Science Group of digitized paintings.

Andersson, S., Goransson, J.: Virtual Texturing with WebGL. Master's thesis, Chalmers University of Technology, Gothenburg, Sweden (2012).

Avenali, Adam, "Color Vision Deficiency and Video Games", The Savannah College of Art and Design, Mar. 2013.

Badlani et al., "A Novel Technique for Modification of Images for Deuteranopic Viewers", May 2016.

Belytschko et al., "Assumed strain stabilization of the eight node hexahedral element," Computer Methods in Applied Mechanics and Engineering, vol. 105(2), pp. 225-260 (1993), 36 pages.

Belytschko et al., Nonlinear Finite Elements for Continua and Structures, Second Edition, Wiley (Jan. 2014), 727 pages (uploaded in 3 parts).

Blanz V, Vetter T. A morphable model for the synthesis of 3D faces. In Proceedings of the 26th annual conference on Computer graphics and interactive techniques Jul. 1, 1999 (pp. 187-194). ACM Press/Addison-Wesley Publishing Co.

Blanz et al., "Reanimating Faces in Images and Video" Sep. 2003, vol. 22, No. 3, pp. 641-650, 10 pages.

Chao et al., "A Simple Geometric Model for Elastic Deformations", 2010, 6 pgs.

Cook et al., Concepts and Applications of Finite Element Analysis, 1989, Sections 6-11 through 6-14.

Cournoyer et al., "Massive Crowd on Assassin's Creed Unity: AI Recycling," Mar. 2, 2015, 55 pages.

Dick et al., "A Hexahedral Multigrid Approach for Simulating Cuts in Deformable Objects", IEEE Transactions on Visualization and Computer Graphics, vol. X, No. X, Jul. 2010, 16 pgs.

Diziol et al., "Robust Real-Time Deformation of Incompressible Surface Meshes", to appearin Proceedings of the 2011 ACM SIGGRAPH/Eurographics Symposium on Computer Animation (2011), 10 pgs.

Dudash, Bryan. "Skinned instancing." NVidia white paper(2007).

Fikkan, Eirik. Incremental loading of terrain textures. MS thesis. Institutt for datateknikk og informasjonsvitenskap, 2013.

Geijtenbeek, T. et al., "Interactive Character Animation using Simulated Physics", Games and Virtual Worlds, Utrecht University, The Netherlands, The Eurographics Association 2011, 23 pgs.

Georgii et al., "Corotated Finite Elements Made Fast and Stable", Workshop in Virtual Reality Interaction and Physical Simulation VRIPHYS (2008), 9 pgs.

Habibie et al., "A Recurrent Variational Autoencoder for Human Motion Synthesis", 2017, in 12 pages.

Halder et al., "Image Color Transformation for Deuteranopia Patients using Daltonization", IOSR Journal of VLSI and Signal Processing (IOSR—JVSP) vol. 5, Issue 5, Ver. I (Sep.-Oct. 2015), pp. 15-20.

Han et al., "On-line Real-time Physics-based Predictive Motion Control with Balance Recovery," Eurographics, vol. 33(2), 2014, 10 pages.

Hernandez, Benjamin, et al. "Simulating and visualizing real-time crowds on GPU clusters." Computaci6n y Sistemas 18.4 (2014): 651-664.

Hu G, Chan CH, Yan F, Christmas W, Kittler J. Robust face recognition by an albedo based 3D morphable model. In Biometrics (IJCB), 2014 IEEE International Joint Conference on Sep. 29, 2014 (pp. 1-8). IEEE.

Hu Gousheng, Face Analysis using 3D Morphable Models, Ph.D. Thesis, University of Surrey, Apr. 2015, pp. 1-112.

Irving et al., "Invertible Finite Elements for Robust Simulation of Large Deformation", Eurographics/ACM SIGGRAPH Symposium on Computer Animation (2004), 11 pgs.

Kaufmann et al., "Flexible Simulation of Deformable Models Using Discontinuous Galerkin FEM", Oct. 1, 2008, 20 pgs.

Kavan et al., "Skinning with Dual Quaternions", 2007, 8 pgs.

Kim et al., "Long Range Attachments—A Method to Simulate Inextensible Clothing in Computer Games", Eurographics/ACM SIGGRAPH Symposium on Computer Animation (2012), 6 pgs.

Klein, Joseph. Rendering Textures Up Close in a 3D Environment Using Adaptive Micro-Texturing. Diss. Mills College, 2012.

Komura et al., "Animating reactive motion using momentum-based inverse kinematics," Computer Animation and Virtual Worlds, vol. 16, pp. 213-223, 2005, 11 pages.

Lee, Y. et al., "Motion Fields for Interactive Character Animation", University of Washington, Bungie, Adobe Systems, 8 pgs, obtained Mar. 20, 2015.

Levine, S. et al., "Continuous Character Control with Low-Dimensional Embeddings", Stanford University, University of Washington, 10 pgs, obtained Mar. 20, 2015.

Macklin et al., "Position Based Fluids", to appear in ACM TOG 32(4), 2013, 5 pgs.

McAdams et al., "Efficient Elasticity for Character Skinning with Contact and Collisions", 2011, 11 pgs.

McDonnell, Rachel, et al. "Clone attack! perception of crowd variety." ACM Transactions on Graphics (TOG). vol. 27. No. 3. ACM, 2008.

Muller et al., "Meshless Deformations Based on Shape Matching", SIGGRAPH 2005, 29 pgs.

Muller et al., "Adding Physics to Animated Characters with Oriented Particles", Workshop on Virtual Reality Interaction and Physical Simulation VRIPHYS (2011), 10 pgs.

(56) References Cited

OTHER PUBLICATIONS

Muller et al., "Real Time Dynamic Fracture with Columetric Approximate Convex Decompositions", ACM Transactions of Graphics, Jul. 2013, 11 pgs.
Muller et al., "Position Based Dymanics", VRIPHYS 2006, Oct. 21, 2014, Computer Graphics, Korea University, 23 pgs.
Musse, Soraia Raupp, and Daniel Thalmann. "Hierarchical model for real time simulation of virtual human crowds." IEEE Transactions on Visualization and Computer Graphics 7.2 (2001): 152-164.
Nguyen et al., "Adaptive Dynamics With Hybrid Response," 2012, 4 pages.
O'Brien et al., "Graphical Modeling and Animation of Brittle Fracture", GVU Center andCollege of Computing, Georgia Institute of Technology, Reprinted from the Proceedings of ACM SIGGRAPH 99, 10 pgs, dated 1999.
Orin et al., "Centroidal dynamics of a humanoid robot," Auton Robot, vol. 35, pp. 161-176, 2013, 18 pages.
Parker et al., "Real-Time Deformation and Fracture in a Game Environment", Eurographics/ACM SIGGRAPH Symposium on Computer Animation (2009), 12 pgs.
Pelechano, Nuria, Jan M. Allbeck, and Norman I. Badler. "Controlling individual agents in high-density crowd simulation." Proceedings of the 2007 ACM SIGGRAPH/Eurographics symposium on Computer animation. Eurographics Association, 2007. APA.
Rivers et al., "FastLSM: Fast Lattice Shape Matching for Robust Real-Time Deformation", ACM Transactions on Graphics, vol. 26, No. 3, Article 82, Publication date: Jul. 2007, 6 pgs.
Ruiz, Sergio, et al. "Reducing memory requirements for diverse animated crowds." Proceedings of Motion on Games. ACM, 2013.
Rungjiratananon et al., "Elastic Rod Simulation by Chain Shape Matching withTwisting Effect" SIGGRAPH Asia 2010, Seoul, South Korea, Dec. 15-18, 2010, ISBN 978-1-4503-0439-9/10/0012, 2 pgs.
Seo et al., "Compression and Direct Manipulation of Complex Blendshape Models", In ACM Transactions on Graphics (TOG) Dec. 12, 2011 (vol. 30, No. 6, p. 164). ACM. (Year: 2011), 10 pgs.
Sifakis, Eftychios D., "FEM Simulations of 3D Deformable Solids: A Practioner's Guide to Theory, Discretization and Model Reduction. Part One: The Classical FEM Method and Discretization Methodology", SIGGRAPH 2012 Course, Version 1.0 [Jul. 10, 2012], 50 pgs.
Stomakhin et al., "Energetically Consistent Invertible Elasticity", Eurographics/ACM SIGRAPH Symposium on Computer Animation (2012), 9 pgs.
Thalmann, Daniel, and Soraia Raupp Musse. "Crowd rendering." Crowd Simulation. Springer London, 2013. 195-227.
Thalmann, Daniel, and Soraia Raupp Musse. "Modeling of Populations." Crowd Simulation. Springer London, 2013. 31-80.
Treuille, A. et al., "Near-optimal Character Animation with Continuous Control", University of Washington, 2007, 7 pgs.
Ulicny, Branislav, and Daniel Thalmann. "Crowd simulation for interactive virtual environments and VR training systems." Computer Animation and Simulation 2001 (2001 ): 163-170.
Vaillant et al., "Implicit Skinning: Real-Time Skin Deformation with Contact Modeling", (2013) ACM Transactions on Graphics, vol. 32 (n ° 4). pp. 1-11. ISSN 0730-0301, 12 pgs.
Vigueras, Guillermo, et al. "A distributed visualization system for crowd simulations." Integrated Computer-Aided Engineering 18.4 (2011 ): 349-363.
Wu et al., "Goal-Directed Stepping with Momentum Control," Eurographics/ ACM SIGGRAPH Symposium on Computer Animation, 2010, 6 pages.
Clavet, "Motion matching and the road to next-gen animation," In Proc. of GDC. 2016 (Year: 2016).
Geijtenbeek et al. Interactive Character Animation Using Simulated Physics: A State-of-the-Art Review), Computer Graphics forum, vol. 31, 2012 (Year: 2012), 24 pgs.
Holden et al., "Phase-functioned neural networks for character control," ACM Transactions on Graphics (TOG). Jul. 20, 2017;36(4): 1-3. (Year: 2017).
Liu Shikai, "Method, Device, Equipment and Storage for generating walking animation of Virtual Character", English Translation of CN 202111374361.9, Nov. 19, 2021 (Year: 2021).
Min et al., "Interative Generation of Human Animation with Deformable Motion Models" (Year: 2009).
Yamane et al.,"Natural Motion Animation through Constraining and Deconstraining at Will" (Year: 2003).
Zhang et al., "Mode-adaptive neural networks for quadruped motion control. ACM Transactions on Graphics (TOG)." Jul. 30, 2018;37(4): 1-1. (Year: 2018).

\* cited by examiner

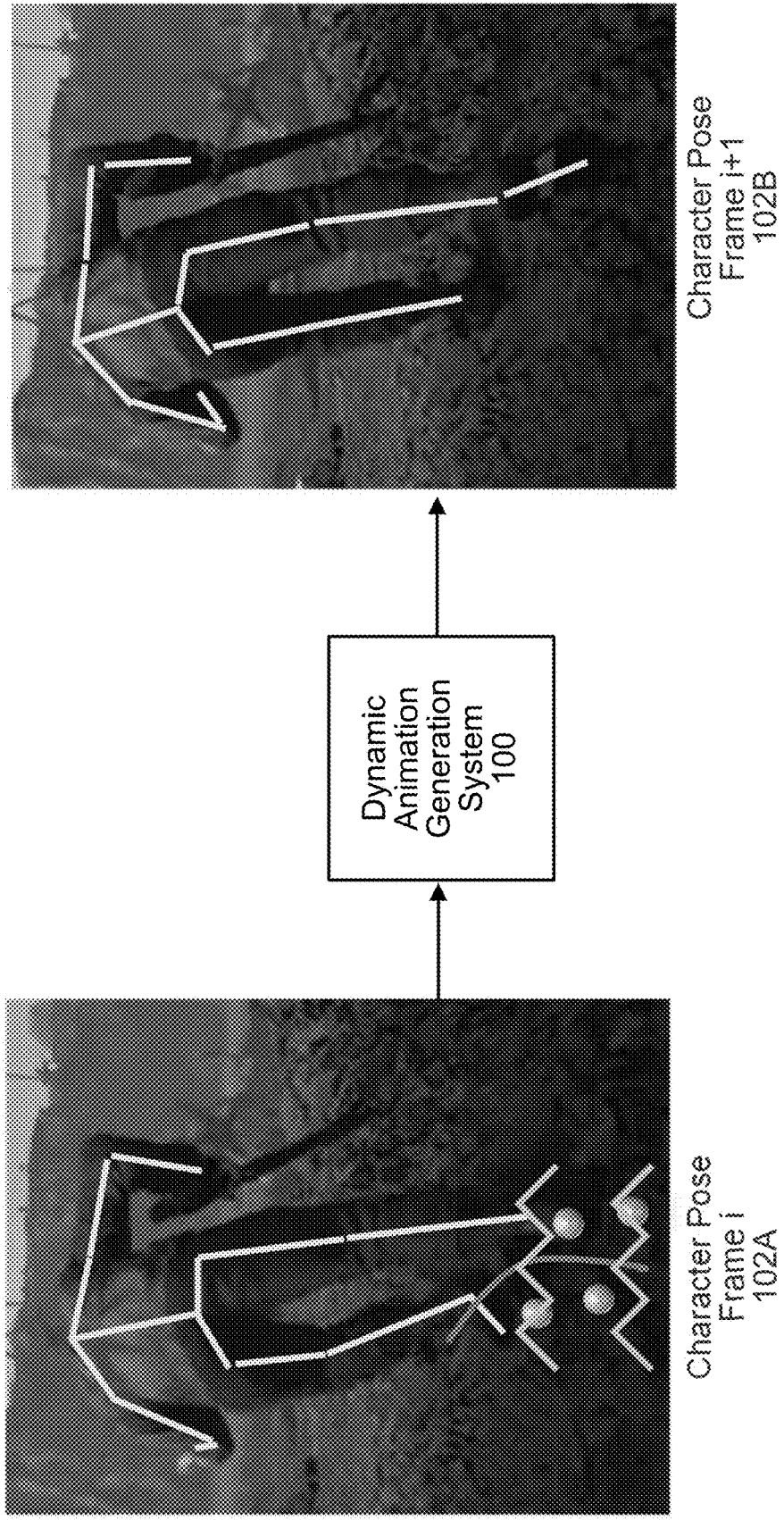

DYNAMIC LOCOMOTION ADAPTATION IN RUNTIME GENERATED ENVIRONMENTS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

TECHNICAL FIELD

The present disclosure relates to systems and techniques for animation generation. More specifically, this disclosure relates to machine learning techniques for dynamically generating animation.

BACKGROUND

Many video games allow a user to control an image that represents a character within a video game environment. For example, sports games will often let a user control a representation of a player on a field and first-person shooters will often let the user control a representation of a shooter within a hostile environment. Some video games will include a number of image or graphics files and/or video files to display the different animations that may occur as a result of the user's interaction with the video game. The greater the variety of movement that is possible within the video game, the more images or animations that may be included in the video game data resulting in a greater amount of required storage space. This need for storage may be exacerbated if the video game includes alternative views of the character.

Some video games reduce the storage required for the graphics or video files by generating animations based on motion capture data. Using features or reference points of an in-game character and motion capture data included with the video game, an animation can be generated that reflects motion of the in-game character. However, as user interactions with the in-game character are unpredictable and as there may be numerous possibilities of interactions, the amount of motion capture data that may be required can also be significant. Further, it can be difficult to capture certain motion capture data due to the use of non-real world characters and non-accessible environments. Moreover, it may be difficult to predict all the possible interactions that may occur in the video game making it difficult to predetermine all the motion capture data that is required during design and development of the video game.

SUMMARY

The systems, methods and devices of this disclosure each have several innovative aspects, no single one of which is solely responsible for all of the desirable attributes disclosed herein. Details of one or more implementations of the subject matter described in this specification are set forth in the accompanying drawings and the description below.

Certain aspects of the present disclosure relate to a computer-implemented method. The method may be implemented by an interactive computing system configured with specific computer-executable instructions. The method may include: receiving a first character pose associated with a first frame of an animation depicting a character in a virtual environment of a video game; receiving one or more virtual environment labels associated with the virtual environment of the video game; applying at least the first character pose and the one or more virtual environment labels to a pose prediction model to obtain a second character pose associated with the character in the virtual environment from the pose prediction model; and generating a second frame of the animation based at least in part on the second character pose, wherein the second frame occurs subsequent to the first frame.

The method of the preceding paragraph can include any combination or sub-combination of the following features: where the one or more virtual environment labels comprise characteristics of the virtual environment that affect motion of the character within the virtual environment; where the method further comprises: receiving one or more control signals corresponding to at least one of motion of the character occurring during the first frame or motion of the character responsive to user input; and applying at least the one or more control signals to the pose prediction model along with the first character pose and the one or more virtual environment labels; where receiving the first character pose comprises receiving a first one or more values associated with a position, a rotation, or a velocity for one or more joints of a skeleton associated with the character, and wherein obtaining the second character pose comprises receiving a second one or more values associated with the position, the rotation, or the velocity for the one or more joints of the skeleton associated with the character; where obtaining the second character pose further comprises receiving an indication of one or more contacts of the character with a surface within the virtual environment; where generating the second frame comprises post-processing the second frame based at least in part on the one or more contacts to resolve motion artifacts of the second character pose with the virtual environment; where the method further comprises obtaining deformation data from the pose prediction model associated with interaction by the character with the virtual environment; where generating the second frame of the animation further comprises modifying the virtual environment based at least in part on the deformation data; where the method further comprises generating the pose prediction model based at least in part on a set of motion capture data captured within a real-world environment and one or more real-world environment labels associated with the real-world environment; where the one or more virtual environment labels associated with the virtual environment comprises at least one virtual environment label with a different value than a corresponding real-world environment label associated with the real-world environment; and where the method further comprises post-processing the set of motion capture data to determine deformation data associated with the real-world environment, wherein the pose prediction model is generated based at least in part on the deformation data.

Additional embodiments of the present disclosure relate to a system that can include an electronic data store and a hardware processor. The electronic data store may be configured to store computer-executable instructions associated with generating frames of an animation. The hardware processor may be in communication with the electronic data store and may be configured to execute the computer-executable instructions to at least: receive a first character pose associated with a first frame of an animation depicting a character in a virtual environment of a video game; receive one or more virtual environment labels associated with the virtual environment of the video game; apply at least the first character pose and the one or more virtual environment labels to a pose prediction model to obtain a second character pose associated with the character in the virtual environment from the pose prediction model; and generate a second frame of the animation based at least in part on the second character pose, wherein the second frame occurs subsequent to the first frame.

The system of the preceding paragraph can include any combination or sub-combination of the following features: where at least one of the one or more virtual environment labels comprises a characteristic of the virtual environment that affects motion of the character within the virtual environment; where the hardware processor is further configured to execute the computer-executable instructions to at least: receive one or more control signals corresponding to at least one of motion of the character occurring during the first frame or motion of the character responsive to user input; and apply at least the one or more control signals to the pose prediction model along with the first character pose and the one or more virtual environment labels; where receiving the first character pose comprises receiving a first one or more values associated with a position, a rotation, or a velocity for one or more joints of a skeleton associated with the character, and wherein obtaining the second character pose comprises receiving a second one or more values associated with the position, the rotation, or the velocity for the one or more joints of the skeleton associated with the character; where obtaining the second character pose further comprises receiving an indication of one or more contacts of the character with a surface within the virtual environment, and wherein the hardware processor is further configured to execute the computer-executable instructions to at least resolve a motion artifact of the character in the second character pose with respect to the virtual environment using the one or more contacts; where the hardware processor is further configured to: obtain, from the pose prediction model, deformation data associated with interaction by the character with the virtual environment; and modify a depiction of the virtual environment within the second frame based at least in part on the deformation data; where the hardware processor is further configured to generate the pose prediction model based at least in part on a set of motion capture data captured within a real-world environment and one or more real-world environment labels associated with the real-world environment; and where the hardware processor is further configured to post-process the set of motion capture data to determine deformation data associated with the real-world environment, wherein the pose prediction model is generated based at least in part on the deformation data.

Yet additional embodiments of the present disclosure relate to a non-transitory computer-readable storage medium storing computer-executable instructions that, when executed by one or more computing devices, configure the one or more computing devices to perform operations comprising: receiving a first character pose associated with a first frame of an animation depicting a character in a virtual environment of a video game; receiving one or more virtual environment labels associated with the virtual environment of the video game; applying at least the first character pose and the one or more virtual environment labels to a pose prediction model to obtain a second character pose associated with the character in the virtual environment from the pose prediction model; and generating a second frame of the animation based at least in part on the second character pose, wherein the second frame occurs subsequent to the first frame.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

FIG. 1A is a block diagram of an example dynamic animation generation system generating a character pose for a frame of an electronic game.

DETAILED DESCRIPTION OF CERTAIN EMBODIMENTS

Overview

Figure 1B:
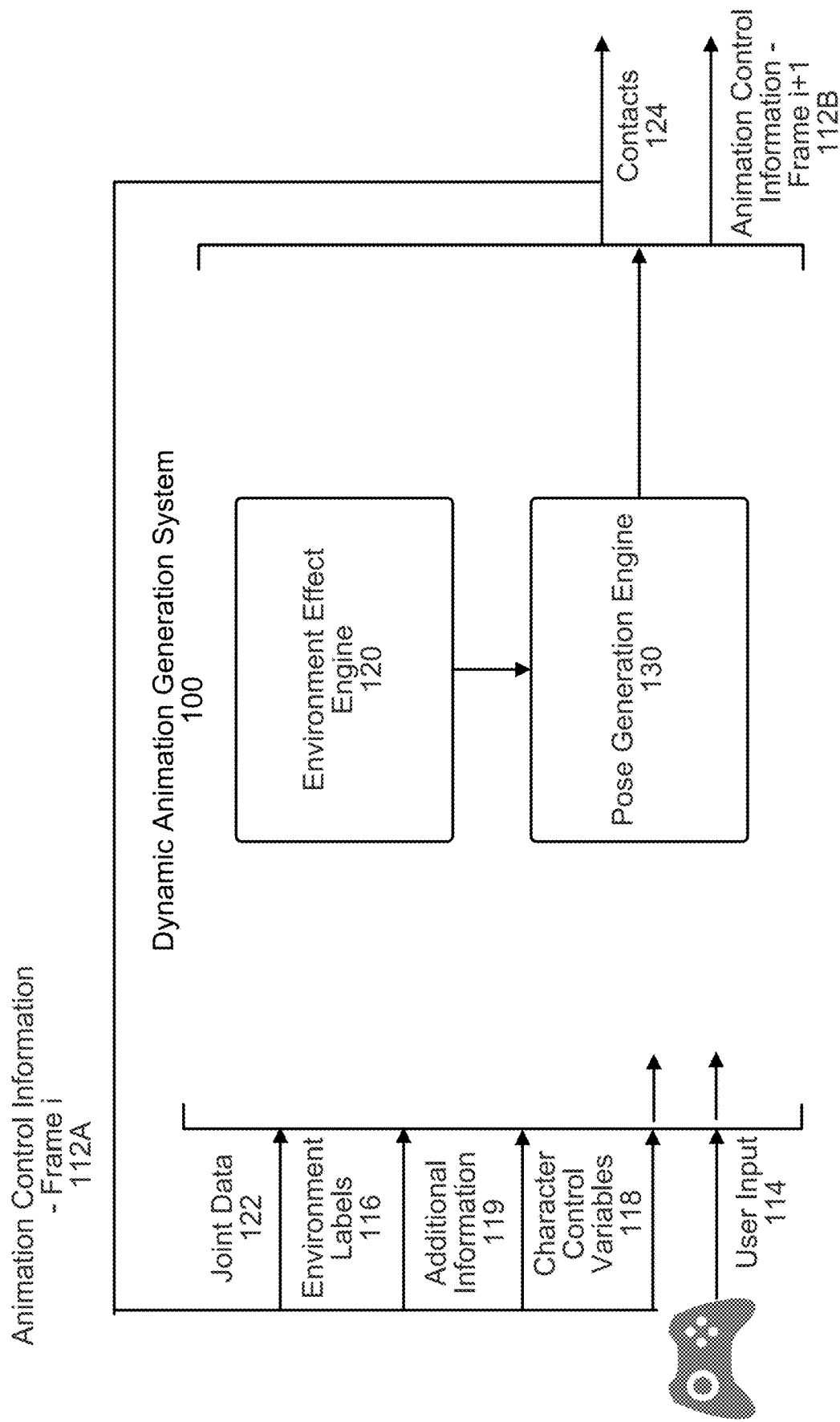
FIG. 1B is a detail block diagram of the dynamic animation generation system.

This specification describes, among other things, technical improvements with respect to generation of motion for characters configured for use in electronic games. One method used to generate motion for characters used in electronic games is to develop a physics engine that attempts to use a physics-based model to determine the motion of the characters in the game. However, physics-based animation during runtime can be relatively unstable and it can be difficult to create realistic animation without unintended actions (e.g., the character falling down). Using motion capture models to generate animation can solve some of the problems that may occur with physics-based animation models.

As will be described, a system described herein (e.g., the dynamic animation generation system 100) may implement a motion generation machine learning model (e.g., a pose generation engine 130) to generate realistic motion based on analyses of motion capture information. Advantageously, the system may perform substantially automated analyses of the motion capture information such that complex machine learning labeling processes may be avoided. Further, the system may use the automated analyses of the motion capture information to extend the generation of realistic motion to new environments that are difficult if not impossible (e.g., underwater environments, non-Earth based gravity environments, non-Earth based atmosphere environments, non-human life supporting temperature environments, etc.) to capture using motion capture technology. While electronic or video games are described, it may be appreciated that the techniques described herein may be applied generally to movement of character models. For example, animated content (e.g., TV shows, movies) and educational software may employ the techniques described herein.

As will be described, the system may generate realistic motion using environment or surface interaction data learned from motion capture data. The system may determine from the motion capture data a motion vector corresponding to the position and rotation of one or more nodes or joints of a skeleton for a pose for a character. This motion vector may be associated with an environment by way of measured environment data or surface properties. For example, the friction of a surface may be measured and associated with the motion capture data. Further, motion capture data may be captured for different environments associated with different environment data or surface properties. The system can interpolate motion vectors for different environments enabling realistic generation of character motion within new and unique environments with respect to both realistic and unrealistic environments and surfaces. As will be described, the system can generate realistic animations using surface properties applied to machine learning models generated based on motion capture data.

The machine learning models may include one or more deep-learning models. An example deep-learning model described herein includes a generative control model usable to inform generation of highly variable, and realistic, animations for characters. As will be described, the generative control model may be trained based on motion capture information of real-world individuals. The model may learn to output a control signal which informs movement of an in-game character within a selected environment. During runtime of an electronic game, the model may leverage environment information of the in-game environment as well as in-game character data and/or user input to generate realistic animation for the environment. As will be described, realistic animations may be generated by the system based on these models.

Background—Motion Generation

Motion may be defined, at least in part, based on distinct poses of an in-game character. As an example, each pose may represent a discrete sample of the motion to be performed by the in-game character. For this example, the pose may identify positions, including rotations, of bones or joints of the in-game character. Thus, if motion is to depict running, each pose may represent a snapshot of the running. For example, a first frame generated by an electronic game may include the in-game character with both feet on a surface within the game world. As another example, a second frame may include the in-game character beginning to move one of the feet upwards. It may be appreciated that subsequent frames may include the in-game character moving forward in a running motion.

Typically, the above-described in-game character may be animated to produce this running motion. For example, an electronic game designer may generate different key frames which depict poses used for the running motion. In this example, the electronic game designer may create key frames which depict the in-game character with its feet on a surface, with one leg partially raised upwards, and so on. During gameplay, the electronic game may interpolate between these key-frames such that the in-game character appears to transition between them. As another example, clips of animation may be generated by the electronic game designer for specific motions. In this example, one or more clips of animation may be generated to represent the running motion. These clips may then be played by the electronic game to produce animation.

To generate motions for in-game characters, electronic game designers are increasingly leveraging motion capture studios. For example, a motion capture studio may be used to learn the realistic gait of an individual as he/she moves about the motion capture studio. Specific portions of the individual, such as joints or bones, may be monitored during this movement. Subsequently, movement of these portions may be extracted from image or video data of the individual, and/or from inertia-based sensors, such as accelerometers or gyroscopic sensors. This movement may then be translated onto a skeleton or rig for use as an underlying framework of one or more in-game characters. The skeleton or rig may include bones, which may be adjusted based on the motion capture images or video. In this way, the skeleton or rig may be animated to reproduce motion performed by the individual.

While motion capture studios allow for realistic motion, they are limited in the types of motion able to be reproduced. For example, the above-described skeleton may be animated to reproduce motions which were specifically performed by the individual. Other motions may thus need to be manually created by an electronic game designer. For example, and with respect to a sports electronic game, a real-life basketball player may be used as an individual to perform common basketball motions. While this individual may perform a wide breadth of motions typically performed during a basketball game, as may be appreciated there are other motions which will not be recorded. For example, these other motions may be produced naturally by the individual during a real-world basketball game depending on locations of opponents, the individual's current stamina level, a location of the individual with respect to the basketball court, and so on.

As another example, the above-described skeleton may be animated to reproduce motions which were specifically performed in a particular environment. Motions in other environments may thus need to be manually created by an electronic game designer. For example, with respect to a first-person shooter game, a real-life individual may be used to perform common running and jumping motions within a set of environments, such as snow, desert, and rain environments. While this individual may perform a wide breadth of motions typically performed by, for example, a soldier in certain environments, as may be appreciated there are other motions which will not be recorded or environments within which the motions will or cannot be recorded. For example, it may be difficult to capture motions of a soldier on an alien planet, with different gravity, with different temperatures, under water (or other fluids), and so on.

Even certain real-world environments may be difficult to capture due to difficulties in recreating the environments in a safe-space, capturing motion capture data within certain environments, or due to time and cost restrictions associated with capturing a full set of possible motions within a large number of different environments. Moreover, certain motions are difficult to capture or difficult to capture safely and with enough frequency to be used to generate animation models. For example, suppose a user desires to capture the motion of running on ice. When running on ice, a person may slip, slide, or otherwise lose control. However, a person generally attempts to avoid sliding or losing control on ice because the person may be harmed if they lose control on ice. Having an individual wearing motion capture equipment attempt to run on ice may result in the individual being hurt. Further, it can be difficult for an individual to run naturally on ice because the individual may intentionally or unintentionally adjust his or her movements to avoid losing control on the ice and being harmed. Accordingly, there are situations where relying on motion capture data can be insufficient to determine how a character may move in a particular environment.

Environment Specific Motion

As will be described, animation techniques described herein may leverage limited sets of motion capture data to generate animations of characters and more specifically, animation of characters within different virtual environments. The character may be represented by a skeleton that is formed from a set of joints and bones. The motion capture data may include the position and rotation of joints of the skeleton within a real-world environment. Further, the motion capture data may include data or labels that identify characteristics of the environment that may affect motion, such as friction, slope, terrain height, surface material, etc.

The system described herein can analyze the motion capture data obtained for different motions and/or different environments to obtain a prediction model. The prediction model may be generated using one or more machine learning algorithms that use the motion capture data as training data. Further, the prediction model can receive as input skeleton information, such as joint and bone information of a character, associated with a frame in an animation. The prediction model may further receive environment or surface properties associated with surfaces in which the character is in contact. Using the skeleton information and the environment or surface properties, the prediction model can output skeleton information corresponding to a likely pose of a subsequent frame. The likely pose of the subsequent frame may account for the environment or surface properties for the environment in which the character is located and/or the surface in which the character is in contact. Advantageously, the environment properties provided as input to the prediction model may differ from the environment properties included in the training data. Thus, animation can be generated that accounts for new environments for which motion capture data is not available. These environments may include real-world environments in which it is difficult to obtain motion capture data due, for example, to expense, storage limitations, potential harm to individuals, or difficulty in performing the motions (e.g., slipping on ice when running). Further, the environments may include non-real world environments or environments that are unsafe for individuals (e.g., underwater environments, space environments, alien plan environments, etc.). The animation described herein may thus be configured to use environment labels or surface properties to create realistic movement in a variety of both realistic and unrealistic environments.

These and other features will now de described in more detail.

Dynamic Animation Generation System

FIG. 1A is a block diagram of an example dynamic animation generation system 100 generating a subsequent character pose 102B based on a current character pose 102A within a particular environment (e.g., a dirt or muddy field). The illustrated dynamic animation generation system 100 may represent a system of one or more computers, one or more virtual machines executing on a system of one or more computers, and so on. In some embodiments, the dynamic animation generation system 100 may represent an application, or other software, which is executed by an electronic game system. Thus, the functionality described herein may be implemented by an electronic game system during gameplay of an electronic game. As will be described, the dynamic animation generation system 100 may implement an environment effect engine 120 and a pose generation engine 130 to autoregressively output character poses to generate motion based on one or more environment characteristics or surface properties.

In the illustrated example, the character pose 102A depicts an in-game character running up a dirt hill out of a trench. This character pose 102A may therefore represent a specific pose used as part of the running motion on a dirt hill surface. Additionally, this character pose 102A may be rendered for output in a particular frame of animation (e.g., frame i). As may be appreciated, fluid animation may be generated at a threshold frame rate (e.g., 30 frames per second, 60 frames per second). Thus, the particular frame of animation may represent one of these frames.

As will be described in more detail, the dynamic animation generation system 100 can generate the subsequent character pose 102B based on the character pose 102A. Further, the dynamic animation generation system 100 can generate the subsequent character pose 102B based on the surface or material properties of the environment in which the character is interacting or is located. This subsequent character pose 102B may then be rendered for output in a subsequent frame of animation (e.g., frame i+1). For example, the dynamic animation generation system 100 may determine positions, orientations, and so on, of a skeleton or rig which underlies the illustrated in-game character. In this example, the in-game character may be rendered to conform to these determined positions, orientations, such that the subsequent pose 102B may be output.

The dynamic animation generation system 100 may autoregressively generate character poses. For example, FIG. 1A illustrates the subsequent character pose 102B being generated based on character pose 102A. Thereafter, the subsequent character pose 102B may be used, at least in part, to generate another character pose. As will be described, this generation may be informed based on user input provided by an end-user using an input controller. Thus, the end-user may guide the resulting animation via interactions with the input controller. Further, the generation of the character poses may be informed based on the properties of the surface with which the character is in contact and/or the properties of the environment in which the character is located.

FIG. 1B is a block diagram illustrating detail of the dynamic animation generation system 100. In this illustrated example, the dynamic animation generation system 100 includes example engines 120 and 130, which are collectively usable to dynamically generate animation.

Animation Control Information

The dynamic animation generation system 100 may generate particular information, referred to herein as 'animation control information', which may be autoregressively used to generate motion for an in-game character. For example, the animation control information may indicate a character pose (e.g., character poses 102A-102B illustrated in FIG. 1A). As illustrated, animation control information 112A generated for a first frame (e.g., frame 'i') may be used as an input for a second frame (e.g., frame 'i+1'). Animation control information 112B for the second frame may be generated by the system 100, and an underlying skeleton or rig of an in-game character may be updated according to an indicated character pose for the second frame.

In addition to character pose, the animation control information 112A may include environment labels 116. As described herein, environment labels may be determined for motion capture data based on the environment in which the motion capture data is obtained. The environment labels may identify the type of environment and/or may include values that are associated with different properties of the environment. In some cases, the environment properties are specific to a surface that the character or object is in contact with (e.g., friction of a surface, hardness of a surface, depth of water level, etc.). In other cases, the environment properties are specific to an ambient property of the environment (e.g., temperature, gravity, atmospheric density, etc.). The environment properties may include any type of property that can affect movement within the environment or movement of a character or object in contact with a surface in the environment. For example, the environment labels may include values or properties associated with: friction of a surface, air resistance, hardness or softness of a surface, springiness of a surface, depth of a surface or of a substance on the surface (e.g., depth of water or snow on the ground, depth of mud or sludge on the ground, etc.), temperature, gravity, atmospheric density, or any properties that can affect the speed, direction, or position of a character or object within the environment. The environment labels may be measurements of specific properties of the environment, such as a temperature value, a measurement of hardness of a surface, a measurement of friction of a surface, etc. Alternatively, or in addition, the environment labels may be values that are not necessarily direct measurements, but that correspond to a relative property of the environment. For example, minimum friction may be assigned a '0' value, maximum friction may be assigned a '1' value, and degrees of friction between minimum and maximum may be assigned values between '0' and '1'. In some cases, the environment labels may include both real-world measurement values and relative in-game values. For example, a temperature of −20 degrees C. may be assigned a value of '0' in the virtual environment and a temperature of 50 degree C. may be assigned a value of '1' in the virtual environment with all other temperatures in the virtual environment being constrained between 0 and 1 corresponding to between −20 and 50 degrees C. in the real world.

During runtime, environment labels 116 may be provided for the virtual environment in which the character is located. The environment labels 116 may correspond at least in part to environment labels extracted, determined, or measured from the environment(s) in which the motion capture data was obtained. The environments in which the motion capture data is obtained may be referred to as real-world environments to distinguish it from the virtual environments generated for an electronic game. Further, the environment labels 116 derived for the real-world environment may be referred to as real-world environment labels to distinguish them from virtual environment labels associated with the virtual environments generated for the electronic game. Although it should be understood that some of the real-world environments may be simulated in the real-world. For example, a snowy environment may be simulated using human-made snow placed in a room where motion capture is occurring. In some cases, some of the environment labels 116 used during runtime may be for virtual environments that differ from the real-world environments. The dynamic animation generation system 100 can determine or predict the impact of the virtual environment on motion of the character by applying the environment labels 116 of the virtual environment to a deep learning model executed by the environment effect engine 120. The deep learning model may be a parameter model or a prediction model that is generated based on the motion capture data and the one or more environment labels of the environment in which the motion capture data is obtained.

Further, during runtime, such as during gameplay, environment labels 116 may be generated or determined for a virtual environment based at least in part on movement of an in-game character. For example, the dynamic animation generation system 100 may autoregressively update environment labels 116 according to the gameplay. As an end user controls an in-game character, the dynamic animation generation system 100 may update the virtual environment labels according to the character's movement within the virtual environment and/or contact with surfaces within the virtual or in-game environment.

Moreover, during runtime, such as during gameplay, joint data 122 may be generated for an in-game character. For example, the dynamic animation generation system 100 may autoregressively update joint data according to the gameplay. As an end user controls an in-game character, the dynamic animation generation system 100 may update the joint data according to the character's contact with an in-game environment and/or movement within the in-game environment. The joint data may include position data of the joint with respect to the environment and/or other joints of the character, and rotation data for the joint.

Animation control information 112A may further include character control variables 118. These variables 118 may inform the in-game character's motion. For example, the character control variables 118 may include trajectory information for the in-game character. In this example, the trajectory information may indicate positions of the in-game character (e.g., a current position and optionally one or more prior positions), velocity of the in-game character (current velocity and optionally one or more prior velocities), and so on. The character control variables 118 may be used to predict subsequent motion of the in-game character. For example, if the in-game character is running forward in frame 'i' then it may be determined that the in-game character will remain running forward in frame 'i+1'.

Character control variables 118 may additionally include interaction vectors which are usable to describe motion associated with the in-game character's interaction with an external object (e.g., a rock, a trampoline, a ball, a weapon, etc.) or environment (e.g., a hill, a stone bridge, a wall, etc.) within a game world. For example, and with respect to a first person shooter, the interaction vectors may be used to direct weapons, such as rifle aiming (e.g., aiming location, recoil, breathing adjustments to aim), or impact of trampolines, ice, snow, or other environmental features or environment objects on the movement of the character. To determine the interaction vectors, the system may determine three-dimensional pivot vectors associated with the character. For example, the three-dimensional pivot vectors may represent horizontally-normalized vectors around a root of the character. The character control variables 118 may further include label information used to describe specific types of motion or actions which the character is performing. Example labels may include Stand or Move and may therefore indicate whether the character is standing or moving for a window of frames centered on a particular frame. With respect to a first-person shooter, example labels may include Strafing, Jump-Shot, Running, Ducking, Sniping, Rocket-Jumping, Grenade Throwing, and so on.

While the character control variables 118 may be used to predict motion, as may be appreciated the end user may adjust the in-game character's motion via user input 114. For example, the end user may utilize an electronic game controller to provide user input in the form of interactions with buttons, control sticks, and so on. In the above-described example in which the in-game character is running, the end user may provide user input 114 to maintain the running. For example, the user input 114 may indicate that a certain control stick is being pushed forward. However, the user input 114 may also indicate that the in-game character is to cease running or perform another movement (e.g., jump, shift directions, stop and throw a grenade, and so on).

The character control variables 118 and user input 114 may therefore be combined by the dynamic animation generation system 100. In this way, the user input 114 may provide adjustments to motion predicted in frame 'i'. In some embodiments, the character control variables 118 and user input 114 may be separately weighted prior to combining. Therefore, a greater or lesser weight may be applied to the user input 114.

The animation control information 112A may further include additional information 119. For example, character state information associated with an in-game character may be included. The character state may indicate, for example, the character pose for the in-game character. For example, the character state may represent positions, rotations, and velocities of bones used in an underlying skeleton or rig of the in-game character. Alternatively, or in addition, the character pose may be determined by the joint data 122. As another example, the character state may indicate health of the character, which may affect character movement (for example, a damaged leg may affect the gait or run of the character).

The additional information 119 may further include conditioning features. For example, conditioning features may be used to describe contacts by the in-game character with an in-game environment. In this example, the contacts may indicate contacts with hands, feet, a head, an external object (e.g., a rifle, or a sword), and so on, by the in-game character with an in-game environment. As may be appreciated, these contacts may be used by the dynamic animation generation system 100 to inform the updating of the joint data 122 or, in some cases, the virtual environment (e.g., environment damage or deformation).

Environment Effect Engine

The environment effect engine 120 may provide rules and weights for use during pose generation by the pose generation engine 130. The rules and weights may be used in part to create the machine learning model or prediction model that predicts the motion of a character within an environment. The rules and weights used during execution of the electronic game may be based at least in part on the environment labels 116 associated with the environment in which the character is location and/or is moving within.

Further, the rules and weights associated with different environment labels 116 may be determined using a machine learning process. The machine learning process may include training a machine learning algorithm (e.g., a neural network) using motion capture data and environment data associated with the machine capture data. Different rules and weights may be determined using different motion capture data associated with different environments. For example, motion capture data obtained for a user moving on an icy surface may result in a first set of rules and weights being determined for a neural network. A second set of rules and weight may be determined for a neural network based on motion capture data obtained for a user moving up a grassy hill. In some cases, a set of rules and weights may be interpolated or determined for a new environment or associated with set of environment labels based at least in part on the motion capture data obtained for a set of environments.

In other words, rules and weights may be used to predict motion in a snowy environment based on the motion capture data obtained for the icy surface and the hilly surface. In some implementations, the rules and weights are applied based on the environment labels 116. In some such cases, a single set of rules and weights may be generated based at least in part on the motion capture data and corresponding environment data for the environments in which the motion capture data is obtained. During runtime, the environment labels 116 may be applied to a prediction model (e.g., a pose prediction model) that is generated based at least in part on the set of rules and weights. The application of the environment labels 116, along with other animation control information 112A of the frame 'i' may be used to predict a pose for the frame 'i+1'.

Pose Generation Engine

To generate the animation control information 112B for frame 'i+1', the dynamic animation generation system 100 includes a pose generation engine 130. As described above, the environment effect engine 120 may determine a machine learning model (e.g., a neural network) that can predict motion and/or a pose for a character based on a current pose of the character and properties of the environment in which the character is located and/or is moving. The pose generation engine 130 can apply a set of environment labels 116 and additional animation control information 112A to the pose generate engine 130 to predict a likely subsequent pose for the character. This predicted subsequent pose may be output as joint data 122 included in the animation control information 112B, and may be used to generate the frame 'i+1'. The joint data 122 may identify the position and rotation of joints of a skeleton or rig used to represent the character.

In this way, the pose generation engine 130 can generate an updated pose, at least in part, during runtime for each frame, or a subset of frames, based on an output of the environment effect engine 120. The pose generation engine 130 may also use the additional information 119 for frame 'i' along with the user input 114. A forward pass through the pose generation engine 130 may be computed and the animation control information 112B for frame 'i+1' may be output by the dynamic animation generation system 100.

Therefore, the pose generation engine 130 may output a character pose for frame 'i+1'. Similar to the above, the animation control information 112B may then be provided as input to the dynamic animation generation system 100, which may continue autoregressively generating motion for the in-game character. In some cases, the animation control information 112B may include a change in environment labels 116 compared to the animation control information 112A. The change in environment labels 116 may occur because, for example, as the character moves, the environment may change. For example, the character may run from snowy ground to frozen dirt. The character may then run back onto snowy ground or onto icy ground or wet ground or any other type of ground that includes different surface properties that can affect motion of the in-game character. The generated motion may be animated by the in-game character through adjustment of, at least, the character pose.

Example Pose Prediction Model Generation Process

Figure 2:
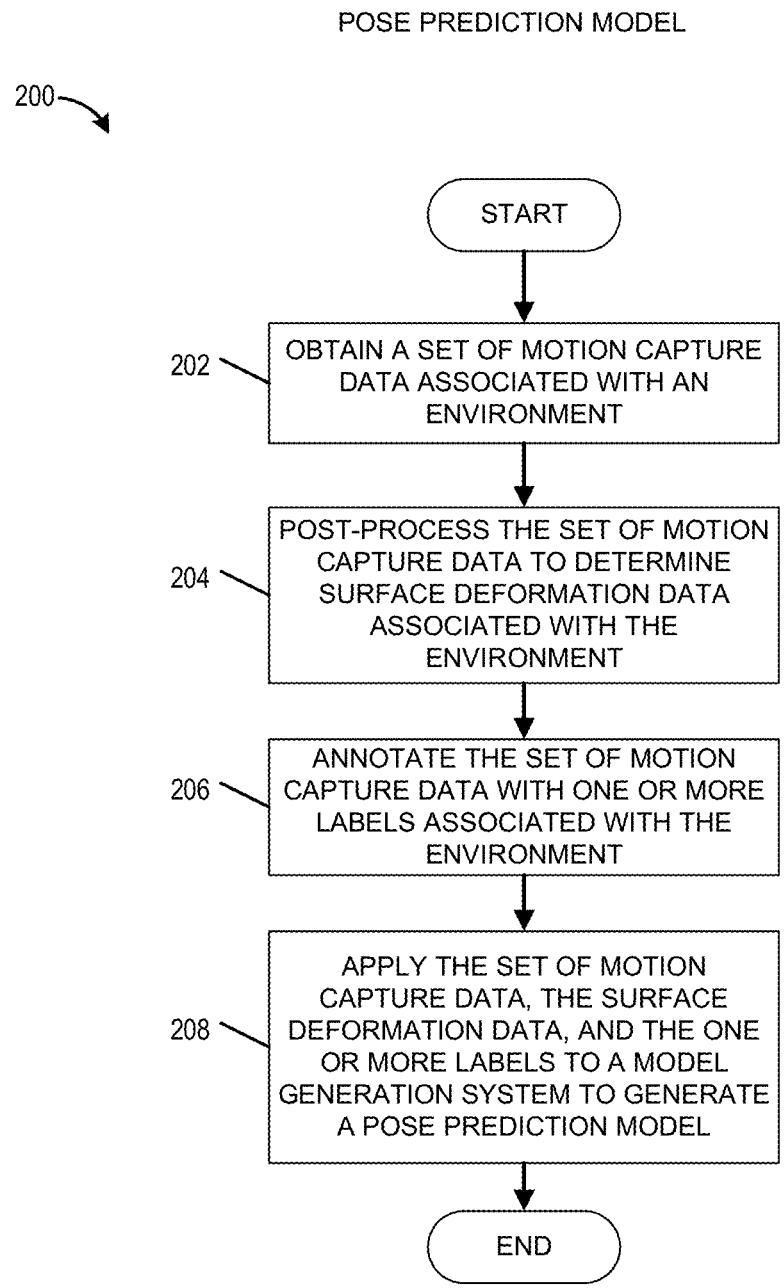
FIG. 2 is a flowchart of an example pose prediction model generation process in accordance with certain embodiments.

FIG. 2 is a flowchart of an example pose prediction model generation process 200 in accordance with certain embodiments. A model generation system may be used to determine one or more prediction models based on training data. In some embodiments, the model generation system may be an environment effect engine 120 configured to generate a pose prediction model that can predict a character pose based at least in part on joint data 122 and environment labels 116. The environment effect engine 120 may generate the pose prediction model using motion capture data as training data.

Further, the environment effect engine 120 may use any type of machine learning model to generate the pose prediction model including supervised and non-supervised machine learning algorithms. Generally, a neural network is used to generate the machine learning model. However, other types of machine learning algorithms may be used including, for example regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

The environment effect engine 120 may generally include a model generation rule set for generation of the prediction model. The rule set may include one or more parameters that may be combined using one or more mathematical functions to obtain the prediction model (which may also be referred to as a parameter function). Further, one or more specific parameters may be weighted by a weight associated with the preference or important of the parameter in predicting the pose of a character. For example, if the position or rotation of a joint is of greater importance than the mass of the character, a parameter associated with the position or rotation of the joint may be weighted more than a parameter associated with the mass of the character. The prediction model may be derived during a training process based at least in part on the motion capture data used as training data. Further, the prediction model may be generated based at least in part on feedback data or additional data derived from the motion capture data and/or provided by a user. For example, environment labels associated with one or more properties or characteristics of the environment may be provided to the environment effect engine 120 to facilitate generation of the prediction model. The environment effect engine 120 may include a model generation rule set that defines specific machine learning rules and/or algorithms the environment effect engine uses to generate the prediction model. In some embodiments, initial parameters and weights can be manually provided during the initiation of a model generation process. The parameters and weights can be updated and modified during the model generation phase to generate the prediction model.

The process 200 is described with respect to the environment effect engine 120. However, it should be understood that the process 200 may be implemented by other computing systems configured to generate prediction functions or models. Further, it should be understood that the process 200 may be updated or performed repeatedly over time. For example, the process 200 may be repeated once per month and/or with the addition on new training data. However, the process 200 may be performed more or less frequently.

The process 200 may begin at block 202 where the environment effect engine 120 obtains a set of motion capture data associated with an environment. The motion capture data may be obtained using inertia-based motion capture. Inertia-based motion capture may use accelerometers, gyroscopes, and other motion-based sensors to detect the motion of the individual. Advantageously, using inertia-based motion capture can reduce or prevent occlusion issues that may occur when obtaining motion capture in an outdoor environment due, for example, to obstacles in the environment (e.g., grass, snow, hills, etc.). However, in some environments, such as in an indoor environment or an outdoor environment without obstacles, optical motion capture may be used instead of inertia-based motion capture. In some embodiments, optical and inertia-based motion capture may both be used in combination.

The set of motion capture data may be associated with a homogenous environment type or a heterogenous environment type. For example, the set of motion capture data may be captured in a substantially homogenous sandy dessert type environment or snow type environment. As another example, the set of motion capture data may be captured in a heterogenous snow type environment that has patches of snowy ground and patches of barren ground without snow. Advantageously, including motion capture data from heterogeneous type environments enable determination of motion in transitions between different types of surfaces or environments (e.g., between snow and non-snow surfaces). Further, the environment may include multiple surface layers of different types. For example, the environment may include thick ice that maintains its integrity when the individual runs or slides on it, but the environment may also include thin ice that cracks or breaks when the individual steps on it. Underneath the thin ice may be water, snow, grass, or any other surface type. In addition to different surface types, the environment may include different ambient characteristics. For example, the set of motion capture data may be captured for different ambient temperatures enabling determination of how a character may move when it is hot versus when it is cold, or different elevations enabling determination of how a character may move when oxygen levels differ.

In some cases, the block 202 may including obtaining multiple sets of motion capture data. At least some of the sets of motion capture data may be associated with a different environment. Alternatively, or in addition, at least some of the sets of motion capture data may be for different individuals performing similar or the same motions within the same environment. Advantageously, by obtaining motion capture data for multiple individuals with different physiological characteristics (e.g., different biological gender, different weight, different height, different muscle mass, different number of appendages, etc.) it is possible to generate different prediction models for different types of characters within the same type of environment as well as for different types of environments. In some cases, motion capture data may also be obtained for non-human creatures (e.g., dogs, horses, or other quadrupeds, etc.) to determine how the non-human characters may move within particular environment types.

In some embodiments, the block 202 may include performing an analysis of a set of corresponding motion capture videos to obtain at least some of the motion capture data. This analysis may be an automated analysis that determined the position and rotation of joints of a skeleton that corresponds to the individual. Further, contact data between the individual and the surface may be determined as part of the motion capture data. The contact data may indicate whether the character is in contact with a surface during a particular frame and/or what portion (e.g., what joint or bone) is in contact with the surface. The contact data may be determined based at least in part on sudden velocity changes, height thresholds of surfaces, height of joints with respect to height of surfaces, rotation changes of joints, momentum changes, an amount of force applied for a particular amount of time, and the like. Further, the properties or values used to determine the contact data may be determined from the inertia-based motion capture data using the one or more motion-sensors used to capture the inertia-based motion capture data. Alternatively, or in addition, at least some of the properties or values used to determine the contact data can be measured or determined from images obtained using optical motion capture data and/or from additional motion sensors applied to one or more of the individual or the surface in which the action may impact or make contact with.

At block 204, the environment effect engine 120 post-processes the set of motion capture data to determine surface deformation data associated with the environment. Post-processing the set of motion capture data to determine the surface deformation data may include inferring the ground deformation based on the motion and/or pose of the individual as the individual moves. For example, if the individual's foot is determined to be a centimeter lower after taking a step onto a snowy field, it may be inferred that the ground deformation of the snowy field results in a 1-centimeter lower surface. Further, in some cases, the surface deformation may be estimated or determined using image processing to detect changes in the environment (e.g., changes in ground surface height or terrain height) relating to motion by the individual. As described above, the ground deformation is inferred from the available motion capture data rather than measured. However, in some cases, sensors may be positioned on and around the ground surface where the individual makes contact with the surface to measure ground deformation. Further, the ground deformation data may be measured by a user and supplied as an input to the environment effect engine 120. Generally, the ground deformation data may include any type of data that corresponds to structural changes in the ground or a contact surface due to impact or contact with the individual involved in the motion capture process. For example, the ground deformation data may include a change in height of the terrain or ground (e.g., a change in snow height, or mud height) due to weight of the individual. As another example, the ground deformation data may include data associated with the amount of force associated with cracking a particular thickness of ice. In another example, the ground deformation data may include data associated with the springiness or lack of springiness of tall grasses or wheat that are crushed by or bent by the individual running through a field of the tall grasses or wheat. In some implementations, just as different individuals may be used to determine how environment may affect the motion of individuals with different physiological characteristics, different individuals may be used to determination how different physiological characteristics may affect ground deformation. For example, a heavier individual or an adult individual may cause greater ground deformation than a lighter individual or a child individual. Similarly, an individual with two legs may cause a different ground deformation than an individual with one leg. Further, a non-human creature (e.g., a dog or horse) may cause a different ground deformation than a human individual. In some cases, the post-processing of the motion capture data may be performed to determine contact data for contacts between the character and the environment or a surface in the environment. The contact data may be obtained as described above with respect to the block 202.

At block 206, the environment effect engine 120 annotates the set of motion capture data with one or more labels associated with the environment. As these labels are associated with a real-world environment in which an individual is being used to film or obtain the motion capture data, the one or more labels may be referred to as real-world environment labels to distinguish them from the virtual environment labels corresponding to a virtual environment of an animation or electronic game. Annotating the set of motion capture data may include categorizing the set of motion capture data based on environment properties of the environment in which the motion capture video is filmed or captured. Further, categorizing the set of motion capture data may be based on surface properties of one or more surfaces in the environment. Generally, the surfaces are surfaces that the individual contacts during the motion capture process. Alternatively, or in addition, annotating the set of motion capture data may include linking or otherwise associating the set of motion capture data with the one or more labels associated with the environment. In some cases, each clip and/or frame included in the set of motion capture data may be separately annotated or categorized based on the labels associated with the environment. Advantageously, by separately annotating or categorizing clips or frames, changes in surface contacts and/or transitions in environment can be captured. For example, a first set of frames may be associated with mud because the individual is in contact with mud. But if the individual transitions from a muddy ground to a grassy ground or to concrete (or some other hard surface), the frames where the individual is in contact with the grassy surface or the concrete surface may be associated with different environment labels corresponding to the new surface properties.

The one or more labels may identify characteristics of the environment. For example, the one or more labels may indicate whether the environment includes snow, mud, water, ice, sand, grass, a trampoline, swamp, etc. Further, the one or more labels may specify a measurement or degree of the characteristic. For example, the one or more labels may indicate a depth of the snow or water, a length of the grass, a thickness or hardness of the ice, the bounciness of the trampoline, etc. The aforementioned labels relate to characteristics of the surface of the environment. However, the labels are not limited as such and may indicate other characteristics such as temperature, amount of gravity, degree of friction, degree of hardness or thickness, etc. Some of the labels may be binary indicating the presence of absence of features of the environment (e.g., snow or no snow), other labels may include values that indicate a degree of an environment feature. For example, a value between 0 and 1 may be used to indicate a degree or rain or moisture with 0 being completely dry, 1 being a maximum degree of rain as determined by the electronic game developer, and values between 0 and 1 indicating some amount of rain between none and the amount specified by the maximum amount of rain. As another example, a value between 1 and 10 may be used to indicate a degree of friction.

In some cases, at least some of the characteristics of the environment in which the motion capture data is obtained may be measured using one or more types of sensors. For example, an amount of snow on the ground may be measured with a ruler, a temperature may be measured with a thermometer, etc. In other cases, at least some of the characteristics of the environment in which the motion capture data is obtained may be estimated or associated with a value as defined by a developer of the electronic game. For example, as described above, the developer may determine or specify an amount of rain that is associated with maximum rain fall and an amount of rain that is associated with 50% rain fall, with no rain be the minimum amount of rain fall. Motion capture data may be obtained for each of the specified degrees of rain either during a rainstorm or through simulated rainstorms. Other degrees of rain fall may be interpolated between the values specified by the developer.

At block 208, the environment effect engine 120 applies the set of motion capture data, the surface deformation data, and the one or more environment labels to a machine learning algorithm (e.g., a neural network) to generate a pose prediction model. The pose prediction model can output predictions of joint data and/or bone data of a skeleton corresponding to a character to be animated in a frame. The pose prediction model can base the prediction on joint data and environment data for a prior frame. Further, the pose prediction model may generate different predictions based on the motion or actions performed by the character. The motion or action may be determined from the motion or action of a prior frame and/or from user input (e.g., interaction with a button or joystick that causes the character to move in a particular direction or in a particular manner, such as to jump or slide, etc.). In some embodiments, the inclusion of the surface deformation data may be optional or omitted. Alternatively, or in addition, a separate prediction model may be generated that predicts surface deformation based at least in part on one or more of the set of motion capture data, the surface deformation data, and the one or more environment labels.

In some cases, different pose prediction models may be generated for different sets of environment labels and/or for different types of characters based at least in part on different sets of environment labels and/or individual characteristics. In other cases, a single pose prediction model is generated and the output prediction of the pose prediction model varies based at least in part on the environment labels and/or physiological characteristics of the character.

The pose prediction model may include one or more variables or parameters that can be combined using a mathematical algorithm or model generation ruleset to generate the pose prediction model based on the set of motion capture data, the surface deformation data, and the one or more environment labels. The one or more variables or parameters may include variables corresponding to characteristics derived from one or more of the sets of motion capture data, the surface deformation data, and the one or more environment labels. For example, the variables may correspond to joint positions, joint rotations, character velocity, or other data obtained from individual movement in the motion capture data. As another example, the variables may correspond to surface properties or other environment properties, such as friction, moisture (e.g., rain and/or snow levels), temperature, etc.

In certain embodiments, the block 208 may include applying one or more instances of feedback data. For example, if the pose prediction model is generated as part of a supervised machine learning process, a user (for example, an administrator) may provide one or more inputs to the environment effect engine 120 as the pose prediction model is being generated and/or to refine the prediction model generation process. For example, suppose in part of the motion capture data obtained in a snowy environment the individual places one foot in a bare patch of ground where snow is absent while the other foot remains in snow, a supervisor of the machine learning process may tag the frame that shows the individual's foot on a bare patch of earth to facilitate the determination of how an individual may change movement in snow verses a non-snowy environment. This feedback data may result in reducing the weight applied to the frame when generating the pose prediction model. Alternatively, the feedback data may result in increasing the weight applied to the frame to facilitate identifying character motion when transitioning between snow-based and non-snow based environment types.

In some cases, one or more of the variables or parameters may be weighted based at least in part on the amount of contribution the variable has to determine motion of a character. For example, a variable corresponding to friction may be weighted more than a variable corresponding to temperature. In some cases, the weight may change with the value of the variable. For example, although generally friction may have more impact on motion than temperature, at extreme temperatures the relative importance of temperature to motion may increase. In some such cases, the weight applied to a variable corresponding to temperature may increase.

In some embodiments, the process 200 may be performed with different character properties. For example, physiological characteristics of the individual(s) used to obtain the motion capture data may be supplied at the block 208 to facilitate determining a pose prediction model that account for different character properties when predicting poses. Advantageously, by including physiological parameters of the individual(s) as part of the pose prediction model generation process, it is possible to predict different poses for characters that have different physiological characteristics, such as different biological genders, different weights, different heights, and the like.

Similarly, different weather conditions may also be applied to generate the pose prediction model. For instance, motion capture data obtained when it is raining, windy, dry, snowing, etc. may be used to generate a pose prediction model that accounts for different weather conditions when predicting character poses. In some cases, the motion capture data may be obtained for motion with respect to the weather. For example, motion capture data may be obtained for running in the direction of the wind and additional motion capture data may be obtained for running in the opposite direction or cross-direction of the wind. In some cases, the environment labels include both surface properties and weather conditions. Thus, in some such cases, training data based on weather conditions may be optional or omitted.

In some embodiments, the generation of the pose prediction model for motion of a human can be used to generate a pose prediction model for motion of a non-humanoid character or other skeletal hierarchy for which no motion capture data is available. For example, the latent code or latent space in a neural network pose prediction model for a human can be used to generate a pose prediction model for a quadruped. Advantageously, the use of the latent space to generate new pose prediction models enables the use of embodiments disclosed herein with characters for which motion capture data cannot easily be obtained, such as a dog. Although it may be possible to obtain motion capture data for a dog that runs, a dog may not respond to commands or may not be capable of jumping or performing other actions that a quadruped in a video game or electronic game may perform. By using transfer learning, or the transfer of latent code from one neural network based model to another, it is possible to apply embodiments disclosed herein for human characters to non-human characters.

Example Pose Generation Process

Figure 3:
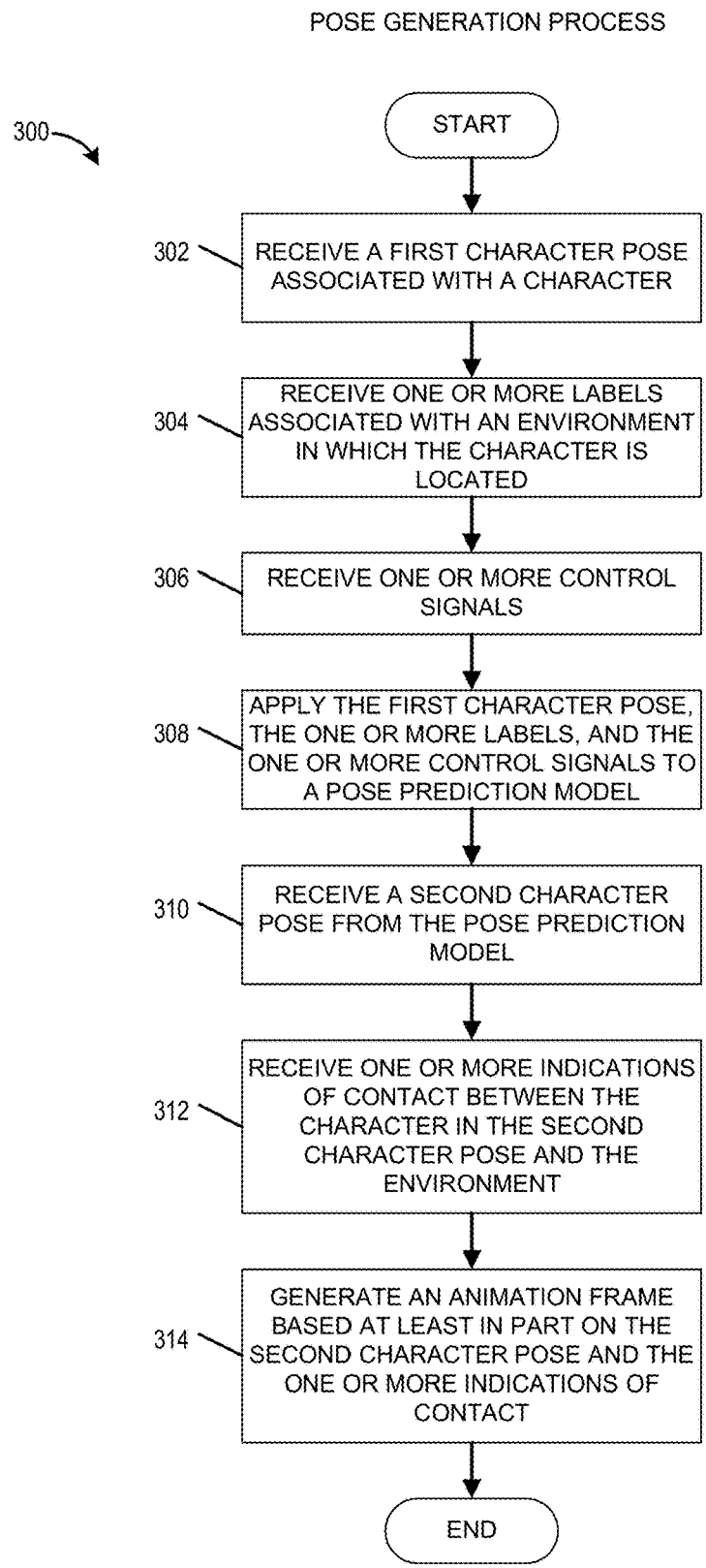
FIG. 3 is a flowchart of an example pose generation process in accordance with certain embodiments.

FIG. 3 is a flowchart of an example pose generation process 300 in accordance with certain embodiments. A pose generation engine 130 may be configured to predict a pose of a character using a pose prediction model that can predict a character pose based at least in part on joint data 122 and environment labels 116. As described above, in some cases the animation control information 112A may include additional information that can be used to predict the character pose, such as character control variables 118, user input 124, and additional information 119. The pose generation engine 130 may be supplied animation control information 112A for a frame i to predict a frame i+1. More specifically, the pose generation engine 130 may output animation control information 112B that may be used to generate the frame i+1.

The process 300 may be used to predict poses of characters in electronic games and to facilitate generating more realistic animation in different environments or on different surfaces based on the predicted poses. However, the process 300, and the present disclosure are not limited as such. For example, embodiments disclosed herein may be used to generate animation for non-electronic game contexts, such as television shows, movies, or educational software.

The process 300 begins at block 302 wherein, for example, the pose generation engine 130 receives a first character pose associated with a character. The character may be human or humanoid (e.g., an alien with same number of legs, same posture, etc. as a human). In some embodiments, the character may by a non-human animal or non-humanoid creature. In cases where the character is non-human or non-humanoid, the process 300 may use a pose prediction model generated using non-human creatures (e.g., dogs, horses, etc.) or human individuals moving in ways that emulate a non-human create (e.g., with a modified posture or on hands and knees). Although embodiments herein can be used with non-human characters, to simplify discussion much of the remaining description assumes a humanoid character. Further, the character may be a user-controlled character, or a computer-controlled character (sometimes referred to as a non-player character or NPC).

Receiving the first character pose may include receiving the animation control information 112A. Further, receiving the animation control information 112A may include receiving values for one or more variables included in the animation control information 112A. For example, receiving the first character pose may include receiving joint data 122, which may include position values, rotation values, velocity values, acceleration values, or any other values that indicate position and/or motion of one or more joints of a skeleton or rig representative of the character. The received values of the one or more variables may be for individual joints, groups of joints, or for the skeleton as a whole.

At block 304, the pose generation engine 130 receives one or more labels (e.g., environment labels 116) associated with an environment in which the character is located. These labels may be referred to as virtual environment labels as they may be associated with a virtual environment of an electronic game or animation as opposed to a real-world environment. However, it should be understood that the virtual environment labels may be the identical to a real-world environment as the virtual environment may simulate a real-world environment. But in some cases, one or more of the virtual environment labels may differ from a corresponding real-world environment label enabling animation to be generated in an environment other than an environment in which motion capture data is captured as part of the process 200. Further, in some cases, one or more of the virtual environment labels may differ from real-world environments enabling animation to be generated in fictional environment which may or may not exist in the real-world, or that may or may not support human-life.

The one or more labels may include values for one or more characteristics of the environment. The characteristics of the environment may include surface characteristics, ambient characteristics, and/or weather characteristics. In some cases, the labels may be associated with the environment in which the character is located. Alternatively, the labels may be specific to the surface of which the character is in contact (e.g., the ground). The labels may include values for one or more variables that define features of the environment that may affect motion of the character. For example, the labels may include values that specify the presence of particular features of the environment (e.g., snow) and/or a degree to which the feature is present (e.g., an amount of snow). In other words, the labels may be binary values indicating presence or absence of a feature, or the labels may be non-binary, such as decimal, floating point, or integer values from a non-binary range that indicate the degree of a feature within the environment. Some non-limiting examples of environment or surface properties that may be included or described by the labels received at the block 304 include: a degree of friction of a surface, a gravitational force in the environment, a temperature, a thickness of snow, a hardness or thickness of ice, a thickness of mud, an amount of sand, a steepness of a hill or a ravine, a thickness of grass, a springiness of a surface (e.g., a trampoline or surface with a trampoline effect), an indication of a type of surface underneath a particular surface (e.g., water, mud, asphalt, etc., underneath a layer of ice or snow), or any other environment or surface property that can affect the motion of a character.

Further, at block 304 multiple sets of labels may be received associated with multiple environment types. For example, a first set of labels may be received for an environment where a character is standing (or currently in contact), and a second set of labels may be received for an environment in which the character is moving towards. In other words, if a character is stepping from a hard surface to an icy or muddy surface, environment labels associated with both the hard surface and the icy or muddy surface may be received at the block 304.

At block 306, the pose generation engine 130 receives one or more control signals. The control signals may include character control variables 118 and/or user input 114. Further the control signals may include one or more values that indicate a type of motion being performed by the character, either in response to user input or in response to interactions with the electronic game environment. The control signals may relate to an action occurring in a current or immediately preceding frame (e.g., the character may have initiated a jump) and/or may be associated with previously performed actions (e.g., the character may be currently sliding after previously running on an icy surface). Further, the control signals may identify actions performed by the character that may affect motion, regardless of whether the actions specifically include motion. Moreover, the control signals may relate to actions performed to the character. For example, the control signals may indicate whether a character is sliding, jumping, colliding with a surface, throwing an item (e.g., a grenade, a spear, a ball, etc.), firing a weapon, has been hit by an object, etc. In some cases, the control information may include a direction the character is moving or facing. In some cases, the direction of movement or the direction the character is facing may modify the prediction of the pose in a subsequent frame of the animation. For example, whether the character is facing or moving into the wind or away from the wind may modify the predicted motion of the character.

Further, the control signals may include any type of information that can indicate to the pose prediction model the subsequent type of pose to depict in a subsequent frame i+1. For example, the control signals may indicate that a subsequent pose should be a jump pose, a sliding pose, a falling pose, a running pose, etc. In some cases, the control signals do not specify the type of pose to be performed next because, for example, the pose prediction model determines or predicts the subsequent pose based on the actions performed and/or the environment labels corresponding to the environment properties.

At block 308, the pose generation engine 130 applies the first character pose, the one or more labels, and the one or more control signals to a pose prediction model. The block 308 may include applying the animation control information 112A to the pose prediction model including, in some cases, additional information 119. The pose prediction model may be generated using the process 200 and one or more sets of motion capture data. Applying the first character pose, the one or more labels, and the one or more control signals to the pose prediction model may include configuring one or more variables of the pose prediction model corresponding to the first character pose, the one or more labels, or the one or more control signals.

At block 310, the pose generation engine 130 receives a second character pose from the pose prediction model. The second character pose may be the pose predicted by the pose prediction model based on the first character pose, the one or more labels, and the one or more control signals. In some cases, the pose prediction model predicts a set of positions, rotations, and/or velocities for each skeleton joint of the character. The combination of the prediction positions, rotations, and velocities may form the predicted pose for the character or may be used to generate a pose for the character. Receiving the second character pose may include receiving similar data as applied to the pose prediction model, but for the next frame i+1. In other words, the input to the pose prediction model may be animation control information 112A and the output may be the animation control information 112B including at least some of the same type of data (e.g., joint data 122) included in the animation control information 112A. Further, the second character pose obtained at the block 310 may serve as input (e.g., a first character pose) for a subsequent frame i+2.

At block 312, the pose generation engine 130 receives one or more indications of contact between the character in the second character pose and the environment. The indication of contact may be determined by comparing the joint data 122 included in the animation control information 112B and the location of environment features of the electronic game. In some cases, the indication of contacts with the environment may include identifying one or more joints or bones of the skeleton that contact the environment. In some cases, the contacts may include a series of contacts associated with a particular part of the skeleton. For example, one contact may be determined for a portion of the character that contacts a layer of snow, and another contact may be determined for a portion of the character that contacts a layer of ground beneath the snow. Advantageously, in certain embodiments, the one or more indications of contact between the character in the second pose and the environment can be used to resolve or smooth out artifacts that may exist from a non-ideal or non-perfect prediction by the pose prediction model that can cause a character to hover or penetrate a surface when the character should remain in contact with a surface. For example, if the location of prediction joint would place a foot slightly below an environment surface, the discrepancy between the joint location and the determined contact for the foot with the surface can be used to adjust the position of the character to resolve or remove undesired animation or motion artifacts (e.g., adjust the position of the joint such that the foot is on the surface and not below the surface). In some embodiments, the block 312 may be optional or omitted.

At block 314, the pose generation engine 130 generates an animation frame based at least in part on the second character pose and the one or more indications of contact. In some embodiments, the dynamic animation generation system 100, an animation engine (not shown), or other computing system or software engine is configured to generate the animation frame based at least in part on the animation control information 112B output by the pose generation engine 130. In cases where determining contacts is optional or omitted, the animation frame may be generated based at least in part on the second character pose, but without consideration of the one or more indications of contact.

In some embodiments, the pose generation engine 130 may determine one or more deformation values associated with deformation of a part of the environment based at least in part on the second character pose and/or the one or more indications of contact between the character in the second character pose and the environment. The deformation values may be determined based on a set of rules associated with contact between the character and the environment. Alternatively, or in addition, the deformation values may be predicted by the pose prediction model. Generating the animation frame at the block 314 may include animating environment deformation based at least in part on the one or more deformation values. The one or more deformation values may include any type of value that is associated with deforming the environment in response to contact or movement by the character. For example, the one or more deformation values may include an indication of surface fracture (e.g., ice cracking), water splashing, snow depth change (e.g., due to force of a foot impacting the snow), grass height change (e.g., due to weight of character), or any other deformation value indicating a change in a characteristic of a surface or environment due to the motion of or contact with the character.

In some embodiments, a separate prediction model may be generated for the environment deformation based on determined deformations that occur during motion capture using individuals with different physiological characteristics (e.g., height or weight). The prediction model may predict environment deformations for different characters. The predicted environment deformations may be used to generate animations that include environment deformations due to character movement or contact with the environment.

Advantageously, using the prediction models disclosed herein, animations can be generated that illustrate movement in an environment that differs from the environments in which the motion capture data is obtained. Further, the prediction models disclosed herein enable predictions of environment deformations for environments that differ from those in which the motion capture data is obtained. Moreover, the prediction models can be used to predict how characters with different physiological characteristics than the individuals used to capture the motion capture data may affect the environment (e.g., cause environment deformations due to movement or contact with the environment surfaces).

In some embodiments, the process 300 may be adapted for use in determining motion of non-humanoid characters (e.g., monsters with 3 legs), or humans that have suffered an injury or have a disability (e.g., a human with one leg, a human with crutches, or a human with a bullet wound, etc.). For example, character properties or character labels may be supplied to the machine learning engine (e.g., the environment effect engine 120) to generate a prediction model based on the character. Using this prediction model, the process 300 can be adapted to predict interaction with the environment or motion based on character properties and/or environment properties. Thus, the animation control information 112B may output pose information based on the character properties enabling an animation frame to be generated that differs based on the properties of the character. For example, a human with two functioning legs may run across a low-friction surface without falling. However, a human with a bullet wound in the leg might be more likely to slip.

In some embodiments, the process 300 may be used for inanimate objects to predict the motion of the object in particular environments. For example, a ball or a grenade thrown in a low gravity environment may move differently than in a high gravity environment.

The process 300 can be performed at runtime enabling an electronic game to generate real-time or close to real-time animation responsive to actions by a user interacting with the electronic game. Advantageously, performing the process 300 at runtime enables the use of unpredictable environment changes and user actions. For example, an environment that was dry dirt can be changed to mud if a user blows up a water tank in the electronic game. This change in the environment may change how the character moves in the game. As another example, the use of explosives may turn flat ground into a ground with a number of holes or divots that may change the motion of the character (e.g., result in more stumbling or falling). By supplying updated environment labels to the pose prediction model as the environment changes, the changing predicted motion of the character can be determined resulting in a more realistic game experience.

Alternatively, or in addition, the process 300 can be performed a priori enabling animation to be pre-generated and stored with the electronic game. Although storing the animation with the electronic game may require more storage space than generating the animation at runtime, it may reduce processing resources. Further, the process 300 can be used to generate animation for non-electronic game contexts. For instances, the process 300 can be used to generation animations for television shows or movies.

Example User Computing Device

Figure 4:
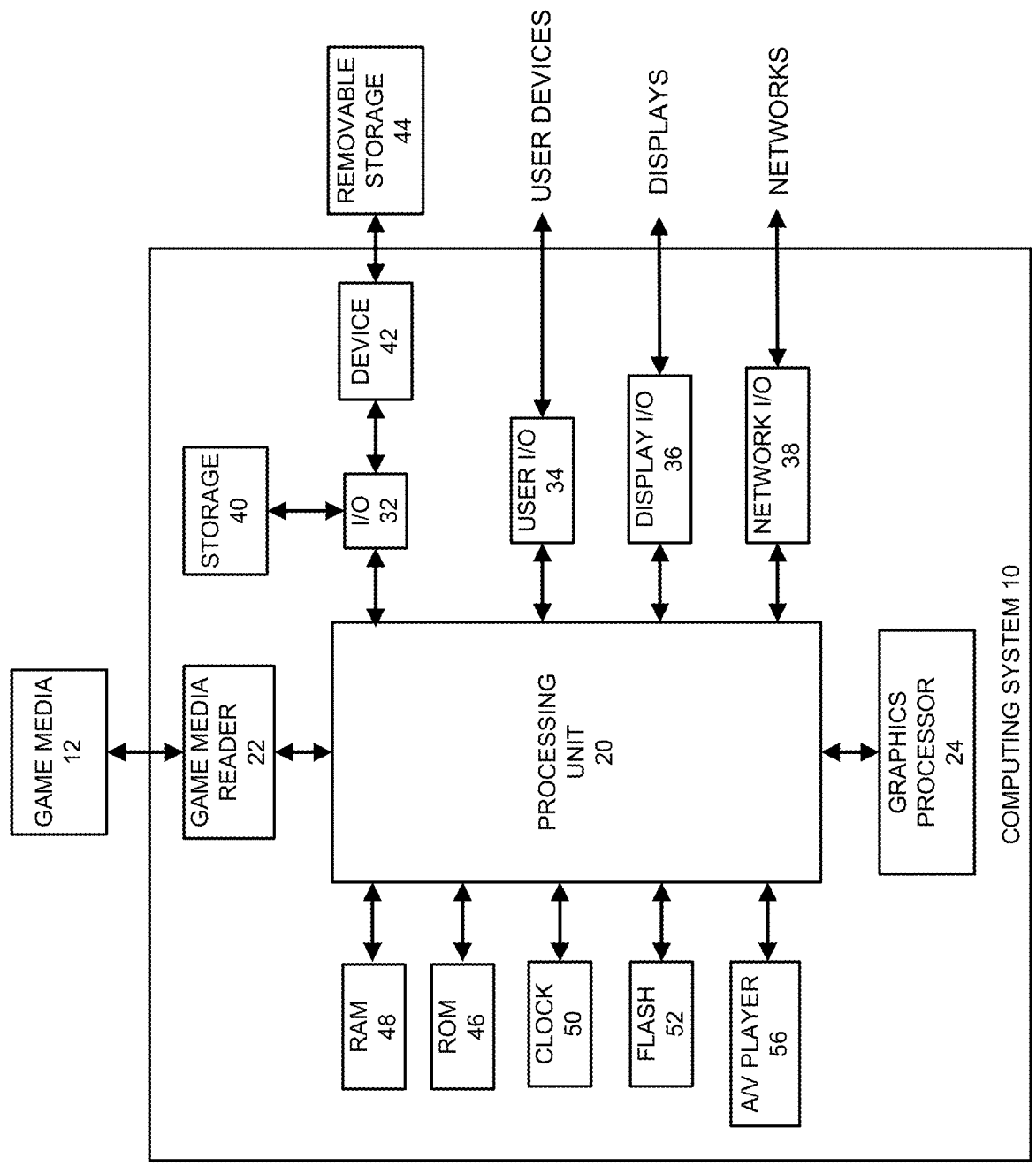
FIG. 4 illustrates an example of a hardware configuration for a user device in accordance with certain aspects of the present disclosure.

FIG. 4 illustrates an example of a hardware configuration for a user computing system or computing system 10 in accordance with certain aspects of the present disclosure. Other variations of the computing system 10 may be substituted for the examples explicitly presented herein, such as removing or adding components to the computing system 10. The computing system 10 may include a dedicated game device, a smart phone, a tablet, a personal computer, a desktop, a laptop, a smart television, a car console display, a dedicated orchestra simulator, and the like. Further, (although not explicitly illustrated in FIG. 4), the computing system 10 may optionally include a touchscreen display, a touchscreen interface, a motion capture interface, or any other type of interface that may detect movement of a conductor baton by a user. The computing system 10 may also be distributed across multiple geographical locations. For example, the computing system 10 may be a cluster of cloud-based servers.

As shown, the computing system 10 includes a processing unit 20 that interacts with other components of the computing system 10 and also components external to the computing system 10. A game media reader 22 may be included that can communicate with game media 12. Game media reader 22 may be an optical disc reader capable of reading optical discs, such as CD-ROM or DVDs, or any other type of reader that can receive and read data from game media 12. In some aspects, the game media reader 22 may be optional or omitted. For example, game content or applications may be accessed over a network via the network I/O 38 rendering the game media reader 22 and/or the game media 12 optional. In some cases, the game media reader 22 may include or be substituted with music media reader.

The computing system 10 may include a separate graphics processor 24. In some cases, the graphics processor 24 may be built into the processing unit 20, such as with an APU. In some such cases, the graphics processor 24 may share Random Access Memory (RAM) with the processing unit 20. Alternatively, or in addition, the computing system 10 may include a discrete graphics processor 24 that is separate from the processing unit 20. In some such cases, the graphics processor 24 may have separate RAM from the processing unit 20. Further, in some cases, the graphics processor 24 may work in conjunction with one or more additional graphics processors and/or with an embedded or non-discrete graphics processing unit, which may be embedded into a motherboard and which is sometimes referred to as an on-board graphics chip or device.

The computing system 10 may also include various components for enabling input/output, such as an I/O 32, a user I/O 34, a display I/O 36, and a network I/O 38. As previously described, the input/output components may, in some cases, including touch-enabled devices. Alternatively, or in addition, the input/output components may include various motion-capture input devices and/or cameras that can detect motion of a user or an object (e.g., a weapon) held by the user. The I/O 32 may interact with storage 40 and, through a device 42, removable storage media 44 in order to provide storage for computing system 10. Processing unit 20 can communicate through I/O 32 to store data, such as game state data and any shared data files. In addition to storage 40 and removable storage media 44, computing system 10 may also include ROM (Read-Only Memory) 46 and RAM 48. RAM 48 may be used for data that is accessed frequently, such as when a game is being played.

User I/O 34 may be used to send and receive commands between processing unit 20 and user devices, such as game controllers. In some cases, the user I/O 34 can include touchscreen inputs. The touchscreen can be a capacitive touchscreen, a resistive touchscreen, or other type of touchscreen technology that is configured to receive user input through tactile inputs from the user. Display I/O 36 may provide input/output functions that can be used to display images from a game being played. For example, the display I/O 36 may display representations of a character moving around a game environment. Network I/O 38 may be used for input/output functions for a network. Network I/O 38 may be used during execution of a game, such as when a game is being played online or being accessed online.

Display output signals may be produced by the display I/O 36 and can include signals for displaying visual content produced by the computing system 10 on a display device, such as graphics, user interfaces, video, and/or other visual content. The computing system 10 may comprise one or more integrated displays configured to receive display output signals produced by the display I/O 36, which may be output for display to a user. According to some embodiments, display output signals produced by the display I/O 36 may also be output to one or more display devices external to the computing system 10.

The computing system 10 can also include other features that may be used with a video game or virtual orchestra, such as a clock 50, flash memory 52, and other components. An audio/video player 56 might also be used to play a video sequence, such as a movie. It should be understood that other components may be provided in the computing system 10 and that a person skilled in the art will appreciate other variations of the computing system 10. Further, it should be understood that other computing elements described herein may be configured similarly or have some or all of the components of the computing system 10.

Program code can be stored in ROM 46, RAM 48, or storage 40 (which might comprise hard disk, other magnetic storage, optical storage, solid state drives, and/or other non-volatile storage, or a combination or variation of these). At least part of the program code can be stored in ROM that is programmable (ROM, PROM, EPROM, EEPROM, and so forth), in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the play of the game and portions thereof might also be reserved for frame buffers, game state and/or other data needed or usable for interpreting user input and generating game displays. Generally, RAM 48 is volatile storage and data stored within RAM 48 may be lost when the computing system 10 is turned off or loses power.

As user computing system 10 reads game media 12 and provides a game, information may be read from game media 12 and stored in a memory device, such as RAM 48. Additionally, data from storage 40, ROM 46, servers accessed via a network (not shown), or removable storage media 44 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

Additional Embodiments

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method comprising:
as implemented by one or more hardware processors of a computing system configured with specific computer-executable instructions,
receiving a first character pose associated with a first frame of an animation depicting a character in a virtual environment of a video game;
receiving one or more virtual environment labels associated with the virtual environment of the video game;
applying at least the first character pose and the one or more virtual environment labels to a pose prediction model to obtain a second character pose associated with the character in the virtual environment from the pose prediction model; and
generating a second frame of the animation based at least in part on the second character pose, wherein the second frame occurs subsequent to the first frame, wherein obtaining the second character pose further comprises receiving an indication of one or more contacts of the character with a surface within the virtual environment, wherein generating the second frame comprises post-processing the second frame based at least in part on the one or more contacts to resolve motion artifacts of the second character pose with the virtual environment.

2. The computer-implemented method of claim 1, wherein the one or more virtual environment labels comprise characteristics of the virtual environment that affect motion of the character within the virtual environment.

3. The computer-implemented method of claim 1, further comprising:
receiving one or more control signals corresponding to at least one of motion of the character occurring during the first frame or motion of the character responsive to user input; and
applying at least the one or more control signals to the pose prediction model along with the first character pose and the one or more virtual environment labels.

4. The computer-implemented method of claim 1, wherein receiving the first character pose comprises receiving a first one or more values associated with a position, a rotation, or a velocity for one or more joints of a skeleton associated with the character, and wherein obtaining the second character pose comprises receiving a second one or more values associated with the position, the rotation, or the velocity for the one or more joints of the skeleton associated with the character.

5. The computer-implemented method of claim 1, further comprising generating the pose prediction model based at least in part on a set of motion capture data captured within a real-world environment and one or more real-world environment labels associated with the real-world environment.

6. The computer-implemented method of claim 5, wherein the one or more virtual environment labels associated with the virtual environment comprises at least one virtual environment label with a different value than a corresponding real-world environment label associated with the real-world environment.

7. The computer-implemented method of claim 5, further comprising post- processing the set of motion capture data to determine deformation data associated with the real-world environment, wherein the pose prediction model is generated based at least in part on the deformation data.

8. A computer-implemented method comprising:
as implemented by one or more hardware processors of a computing system configured with specific computer-executable instructions,
receiving a first character pose associated with a first frame of an animation depicting a character in a virtual environment of a video game;
receiving one or more virtual environment labels associated with the virtual environment of the video game;
applying at least the first character pose and the one or more virtual environment labels to a pose prediction model to obtain a second character pose associated with the character in the virtual environment from the pose prediction model;
generating a second frame of the animation based at least in part on the second character pose, wherein the second frame occurs subsequent to the first frame; and
obtaining deformation data from the pose prediction model associated with interaction by the character with the virtual environment.

9. The computer-implemented method of claim 8, wherein obtaining the second character pose further comprises receiving an indication of one or more contacts of the character with a surface within the virtual environment.

10. The computer-implemented method of claim 8, wherein generating the second frame comprises post-processing the second frame based at least in part on one or more contacts of the character with a surface within the virtual environment to resolve motion artifacts of the second character pose with the virtual environment.

11. The computer-implemented method of claim 8, wherein generating the second frame of the animation further comprises modifying the virtual environment based at least in part on the deformation data.

12. A system comprising:
an electronic data store configured to store computer-executable instructions associated with generating frames of an animation; and
a hardware processor in communication with the electronic data store and configured to execute the computer-executable instructions to at least:
receive a first character pose associated with a first frame of an animation depicting a character in a virtual environment of a video game;
receive one or more virtual environment labels associated with the virtual environment of the video game;
apply at least the first character pose and the one or more virtual environment labels to a pose prediction model to obtain a second character pose associated with the character in the virtual environment from the pose prediction model;
generate a second frame of the animation based at least in part on the second character pose, wherein the second frame occurs subsequent to the first frame, wherein obtaining the second character pose further comprises receiving an indication of one or more contacts of the character with a surface within the virtual environment; and
resolve a motion artifact of the character in the second character pose with respect to the virtual environment using the one or more contacts.

13. The system of claim 12, wherein at least one of the one or more virtual environment labels comprises a characteristic of the virtual environment that affects motion of the character within the virtual environment.

14. The system of claim 12, wherein the hardware processor is further configured to execute the computer-executable instructions to at least:
receive one or more control signals corresponding to at least one of motion of the character occurring during the first frame or motion of the character responsive to user input; and
apply at least the one or more control signals to the pose prediction model along with the first character pose and the one or more virtual environment labels.

15. The system of claim 12, wherein receiving the first character pose comprises receiving a first one or more values associated with a position, a rotation, or a velocity for one or more joints of a skeleton associated with the character, and wherein obtaining the second character pose comprises receiving a second one or more values associated with the position, the rotation, or the velocity for the one or more joints of the skeleton associated with the character.

16. The system of claim 12, wherein the hardware processor is further configured to:
obtain, from the pose prediction model, deformation data associated with interaction by the character with the virtual environment; and
modify a depiction of the virtual environment within the second frame based at least in part on the deformation data.

17. The system of claim 12, wherein the hardware processor is further configured to generate the pose prediction model based at least in part on a set of motion capture data captured within a real-world environment and one or more real-world environment labels associated with the real-world environment.

18. The system of claim 17, wherein the hardware processor is further configured to post-process the set of motion capture data to determine deformation data associated with the real-world environment, wherein the pose prediction model is generated based at least in part on the deformation data.

19. A non-transitory computer-readable storage medium storing computer-executable instructions that, when executed by one or more computing devices, configure the one or more computing devices to perform operations comprising:
receiving a first character pose associated with a first frame of an animation depicting a character in a virtual environment of a video game;
receiving one or more virtual environment labels associated with the virtual environment of the video game;
applying at least the first character pose and the one or more virtual environment labels to a pose prediction model to obtain a second character pose associated with the character in the virtual environment from the pose prediction model;
generating a second frame of the animation based at least in part on the second character pose, wherein the second frame occurs subsequent to the first frame, wherein obtaining the second character pose further comprises receiving an indication of one or more contacts of the character with a surface within the virtual environment; and
resolving a motion artifact of the character in the second character pose with respect to the virtual environment using the one or more contacts.

* * * * *